United States Patent
Kang

(10) Patent No.: US 11,487,662 B2
(45) Date of Patent: Nov. 1, 2022

(54) MEMORY CONTROLLER AND STORAGE DEVICE INCLUDING THE SAME

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/375,472

(22) Filed: Jul. 14, 2021

(65) Prior Publication Data

US 2022/0245064 A1 Aug. 4, 2022

(30) Foreign Application Priority Data

Feb. 2, 2021 (KR) .......................... 10-2021-0014970

(51) Int. Cl.
*G06F 12/08* (2016.01)
*G06F 12/0802* (2016.01)

(52) U.S. Cl.
CPC .... *G06F 12/0802* (2013.01); *G06F 2212/608* (2013.01)

(58) Field of Classification Search
CPC .................................................. G06F 12/0802
See application file for complete search history.

(56) References Cited

U.S. PATENT DOCUMENTS

| 2003/0135703 | A1* | 7/2003 | Martin ................ G06F 11/1464 714/E11.13 |
| 2011/0238886 | A1* | 9/2011 | Post .................... G06F 12/0246 711/170 |

FOREIGN PATENT DOCUMENTS

| KR | 10-1533744 | B1 | 7/2015 |
| KR | 10-2016-0048682 | A | 5/2016 |

* cited by examiner

Primary Examiner — Jae U Yu
(74) Attorney, Agent, or Firm — IP & T Group LLP

(57) ABSTRACT

The present technology relates to a memory controller according to an embodiment includes a map caching controller generating a slot allocation request to allocate a physical slot in which a first map segment is to be stored among a plurality of physical slots, a map buffer manager outputting the first map segment, first physical slot information, and tree slot information, in response to the slot allocation request, and a mapping manager receiving the first map segment, the first physical slot information, and the tree slot information, deleting a second map segment and second physical slot information stored in a tree slot among a plurality of tree slots of a map tree, and storing the first map segment and the first physical slot information in the tree slot. At least one of the second map segment and the second physical slot information stored in the tree slot is invalid.

20 Claims, 17 Drawing Sheets

MEMORY CONTROLLER AND STORAGE DEVICE INCLUDING THE SAME

CROSS-REFERENCE TO RELATED APPLICATION

The present application claims priority under 35 U.S.C. § 119(a) to Korean patent application number 10-2021-0014970, filed on Feb. 2, 2021, with the Korean Intellectual Property Office, and which is incorporated by reference herein in its entirety.

BACKGROUND

1. Field of Invention

One or more embodiments described herein relate to a memory controller and a storage device including a memory controller.

2. Description of Related Art

A memory controller controls the storage of data in a memory device. A volatile memory device stores data only when power is provided. When the power is cut off, the data is lost. Examples of a volatile memory device include a static random access memory (SRAM) and a dynamic random access memory (DRAM). A nonvolatile memory device stores data even when power is cut off. Examples of nonvolatile memory devices include a read only memory (ROM), a programmable ROM (PROM), an electrically programmable ROM (EPROM), an electrically erasable and programmable ROM (EEPROM), and a flash memory.

SUMMARY

One or more embodiments described herein provide a memory controller which may achieve improved read performance. One or more other embodiments provide a storage device which may include such a memory controller.

A memory controller according to an embodiment of the present disclosure may be a memory controller, comprising: a map caching controller configured to generate a slot allocation request to allocate a physical slot among a plurality of physical slots, the allocated physical slot configured to store a first map segment including mapping information between a first logical address and a first physical address of a memory device; a map buffer manager configured to output, in response to the slot allocation request, the first map segment, first physical slot information indicating the physical slot, and tree slot information indicating a tree slot corresponding to the first map segment; and a mapping manager including a map tree including a plurality of tree slots, the mapping manager configured to store, based on the tree slot information, the first map segment and the first physical slot information in the tree slot among the plurality of tree slots. When a second map segment and second physical slot information are stored in the tree slot, the mapping manager is configured to delete the second map segment and the second physical slot information and store the first map segment and the first physical slot information in the tree slot, the second physical slot information indicates a physical slot in which the second map segment is stored, and at least one of the second map segment and the second physical slot information stored in the tree slot is invalid.

A memory controller according to another embodiment of the present disclosure may be a memory controller, comprising: a mapping manager including a map tree and a hash table, the map tree including a plurality of tree slots configured to store some map segments of a plurality of map segments stored in a nonvolatile memory device and physical slot information indicating a plurality of physical slots in a volatile memory device in which the some map segments are stored, and the hash table configured to store at least one map segment most recently stored in the map tree among the some map segments and physical slot information indicating a physical slot in which the at least one map segment is stored; and a map caching controller configured to search for a physical address corresponding to a logical address and to provide the searched physical address and a read command instructing to perform a read operation on the searched physical address to the nonvolatile memory device in response to a read request. The plurality of map segments include mapping information between a logical address and a physical address.

A storage device according to still another embodiment of the present disclosure may include a nonvolatile memory device configured to store a plurality of map segments including mapping information between a logical address and a physical address, a volatile memory device configured to store some map segments among the plurality of map segments in a plurality of physical slots, and a memory controller configured to control the nonvolatile memory device to perform a read operation on a first physical address corresponding to a first logical address, in response to a read request. The memory controller may include a map tree including a plurality of tree slots configured to store physical slot information indicating the plurality of physical slots and the some map segments, and a hash table configured to store at least one map segment most recently stored in the map tree among the some map segments and physical slot information indicating a physical slot in which the at least one map segment is stored. The memory controller is configured to search for the first physical address in the hash table and search for the first physical address in the map tree when the first physical address is not searched in the hash table.

According to the present technology, a memory controller with improved read performance, and a storage device including the same are provided.

DETAILED DESCRIPTION

Structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
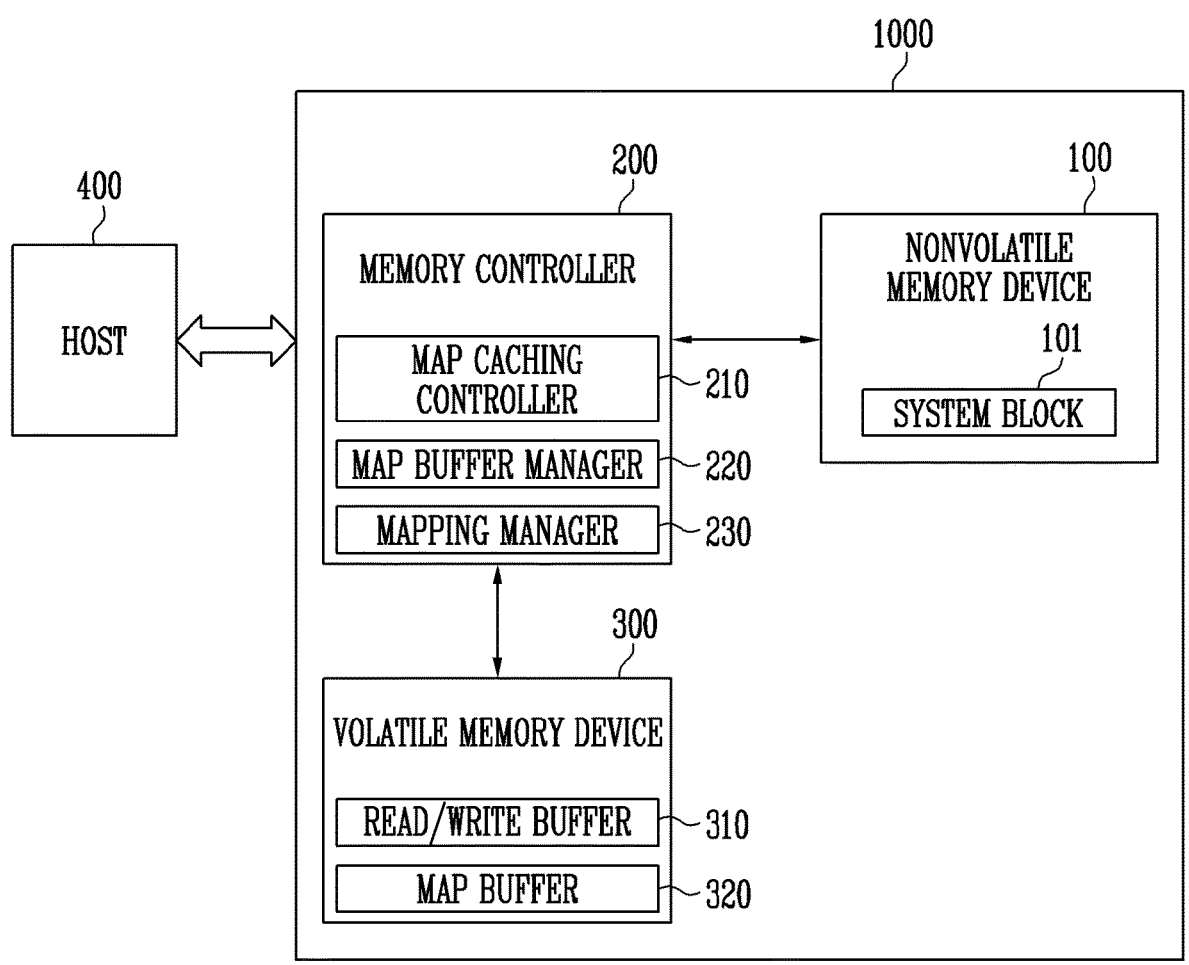
FIG. 1 illustrates an embodiment of a storage system.

FIG. 1 is a diagram illustrating an embodiment of a storage system, which may be implemented as a personal computer (PC), a data center, a corporate data storage system, a data processing system including a direct attached storage (DAS), a data processing system including a storage area network (SAN), and a data processing system including a network attached storage (NAS), or the like.

The storage system may include a storage device 1000 and a host 400. The storage device 1000 may store data according to a request of the host 400, such as a cellular phone, a smartphone, an MP3 player, a laptop computer, a desktop computer, a game player, a TV, a tablet PC, or an in-vehicle infotainment system.

The storage device 1000 may be one of various types of storage devices according to a host interface that is a communication method with the host 400. Examples of the storage device 1000 include an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 1000 may be one of various types of packages. Examples include a package on package (POP), a system in package (SIP), a system on chip (SOC), a multi-chip package (MCP), a chip on board (COB), a wafer-level fabricated package (WFP), and a wafer-level stack package (WSP). In an embodiment, the number of storage devices 1000 may be one or more. A plurality of storage devices 1000 may operate, for example, in redundant array of independent disks or redundant array of inexpensive disks (RAID) system operating in one storage device logically.

The storage device 1000 may include a nonvolatile memory device 100, a memory controller 200, and a volatile memory device 300. The nonvolatile memory device 100 may operate in response to control of the memory controller 200. For example, the nonvolatile memory device 100 may receive commands and addresses from the memory controller 200 and access memory cells selected by the addresses. The nonvolatile memory device 100 may perform an operation instructed by the command on the memory cell selected by the address.

The command may be, for example, a program command, a read command, or an erase command, and the operation instructed by the command may be, for example, a program operation (or a write operation), a read operation, or an erase operation.

A program operation may store data from the host 400 in response to control of the memory controller 200. For example, the nonvolatile memory device 100 may receive the program command, an address, and the data, and program the data in a memory cell selected by the address. Here, the data to be programmed in the selected memory cell may be write data. The write data may include data (or user data) from the host 400 and meta data of the data.

A read operation may read data stored in the nonvolatile memory device 100 in response to the control of the memory controller 200. For example, the nonvolatile memory device 100 may receive a read command and an address, and read data from a region selected by the address in the memory cell array. The data to be read from the selected region may be the read data.

An erase operation may erase the data stored in a memory device in response to the control of the memory controller 200. For example, the nonvolatile memory device 100 may receive an erase command and an address, and erase data stored in a region selected by the address.

Examples of the nonvolatile memory device 100 include a resistive random access memory (RRAM), a phase-change random access memory (PRAM), a magnetoresistive random access memory (MRAM), a ferroelectric random access memory, a spin transfer torque random access memory, flash memory, and the like. For example, the flash memory may include a NAND flash memory, a vertical NAND flash memory, a NOR flash memory, and the like. For convenience of description and purposes of discussion, it is assumed that the nonvolatile memory device 100 is a NAND flash memory.

The nonvolatile memory device 100 may store the write data, or may read the stored read data and provide the read data to the memory controller 200, under the control of the memory controller 200. The nonvolatile memory device 100 may include at least one plane. The one plane may include a memory cell array including memory cells storing the write data.

In one embodiment, the memory cell array may include a plurality of memory blocks. The memory block may be a unit for performing an erase operation of erasing data. The plurality of memory blocks may include a system block 101, which may be a memory block that stores the meta data. In one embodiment, a plurality of system blocks 101 may be provided. Some of the memory blocks may be implemented as a system block 101.

The meta data may include or indicate information on the data stored in the memory blocks. For example, the meta data may include map data indicating a mapping relationship between a logical address and a physical address. In one embodiment, the map data may include mapping information between the logical address and the physical address. The map data may include a plurality of map segments, with each map segment including one or more map entries. One map entry may include mapping information on one logical address. One logical address may be an address corresponding to 4 KB of data, which, for example, may be called 4 KB mapping. The meta data may include other or additional types of information in another embodiment.

In an embodiment, the memory blocks may include a user block, which may be a memory block that stores data. Some of the memory blocks may be implemented as a user block. The memory block may include a plurality of pages, with each page being a unit for performing a program operation of storing write data or a read operation of reading stored read data.

The memory cell may be a single level cell (SLC) that stores one bit of data, a multi-level cell (MLC) that stores two bits of data, a triple-level cell (TLC) that stores three bits of data, and a quadruple level cell (QLC) that stores four bits of data. However, the present disclosure is not limited thereto, and the memory cell may store five or more bits of data.

In an embodiment, the nonvolatile memory device 100 may perform an operation instructed by a command in, for example, a plane interleaving method. The plane interleaving method may be a method in which operations on each of two or more planes are at least partially overlapped.

The memory controller 200 may control overall operation of the storage device 1000. When power is applied to the storage device 1000, the memory controller 200 may execute firmware or other types of instructions. When the nonvolatile memory device 100 is a flash memory device, the firmware may include a host interface layer, a flash translation layer, and a flash interface layer. The power may be, for example, power supplied from an external source.

The host interface layer may control an operation between the host 400 and the memory controller 200. The flash translation layer may convert a logical address from the host 400 to a physical address. The flash interface layer may control communication between the memory controller 200 and the nonvolatile memory device 100.

The memory controller 200 may control the nonvolatile memory device 100 to perform an operation corresponding to a request from the host 400. For example, the memory controller 200 may control the nonvolatile memory device 100 to perform each of the program operation, the read operation, and the erase operation on a physical address corresponding to a logical address from the host 400 in response to a write request, a read request, and an erase request of the host 400, respectively.

During a program operation, the memory controller 200 may provide the program command, the physical addresses, and the write data to the nonvolatile memory device 100. In an embodiment, during the program operation, the memory controller 200 may provide the program command and the physical address to the nonvolatile memory device 100. In addition, the memory controller 200 may provide a flush command to the volatile memory device 300 to provide (or flush) data temporarily stored in the volatile memory device 300 to the nonvolatile memory device 100. When the data temporarily stored in the volatile memory device 300 is provided to the nonvolatile memory device 100, the data temporarily stored in the volatile memory device 300 may be erased.

During a read operation, the memory controller 200 may provide the read command and the physical address to the nonvolatile memory device 100.

During an erase operation, the memory controller 200 may provide the erase command and the physical address to the nonvolatile memory device 100. The physical address may correspond to the logical address from the host 400. Whether the physical address to be provided to the nonvolatile memory device 100 corresponds to the logical address from the host 400 may be checked using the map data stored in the nonvolatile memory device 100. For example, the memory controller 200 may obtain the physical address corresponding to the logical address from the host 400 using the map data. In one embodiment, the memory controller 200 may control the nonvolatile memory device 100 to read the map data related to the logical address from the host 400 among all map data stored in the nonvolatile memory device 100 before the program operation or the read operation is performed. When the map data is read, the memory controller 200 may obtain the physical address using the map data.

In one embodiment, the memory controller 200 may generate commands, addresses, and data autonomously regardless of a request from the host 400. The memory controller 200 may transmit the autonomously generated commands, addresses, and data to the nonvolatile memory device 100. For example, the memory controller 200 may generate a command, one or more addresses, and data for performing a background operation. In addition, the memory controller 200 may provide the command, the one or more addresses, and the data to the nonvolatile memory device 100. The command for performing the background operation may be, for example, the program command or the read command.

The background operation may be at least one of wear leveling, read reclaim, or garbage collection operation. The wear leveling operation may be, for example, static wear leveling operation, dynamic wear leveling operation, and the like. A static wear leveling operation may involve storing the number of times memory blocks are erased and moving cold data (in which an erase operation or a write operation hardly occurs) to a memory block having the largest number of times memory blocks are erased. A dynamic wear leveling operation may involve storing the number of times memory blocks are erased and programming data in a memory block having the least number of erase times.

A read reclaim operation may involve moving data stored in a memory block to another memory block before an uncorrectable error occurs in data stored in a memory block.

A garbage collection operation may involve copying valid data in a bad block among memory blocks to a free block and erasing invalid data in the bad block. Here, copying the valid data in the bad block to the free block may involve moving the valid data in the bad block to the free block.

The memory controller 200 may control two or more memory devices 100. In this case, the memory controller 200 may control the memory devices 100 according to, for example, an interleaving method to improve operation performance. The interleaving method may be a method of controlling operations of two or more memory devices 100 to overlap.

The volatile memory device 300 may store data only while receiving power from a power source. The volatile memory device 300 may temporarily store data from the host 400. The volatile memory device 300 may temporarily store data to be stored in the nonvolatile memory device 100. The volatile memory device 300 may temporarily store data provided from the nonvolatile memory device 100.

The volatile memory device 300 may be in the memory controller 200 or may be outside and coupled to the memory controller 200. Examples of the volatile memory device 300 include a DRAM, an SRAM, a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), or the like.

Since an operation speed of the volatile memory device 300 may be relatively faster than an operation speed of the nonvolatile memory device 100, the memory controller 200 may obtain the physical address corresponding to the logical address more quickly. This may be the case, for example, when the map data is previously stored in the volatile memory device 300. Therefore, storage device 1000 may use some areas of the volatile memory device 300 as one type of cache memory for the map data.

The volatile memory device 300 may include a read/write buffer 310 and a map buffer 320. The read/write buffer 310 may temporarily store data from the host 400. In one embodiment, the read/write buffer 310 may temporarily store the data from the nonvolatile memory device 100. The data stored in the read/write buffer 310 may be, for example, the write data or the read data.

The map buffer 320 may temporarily store the map data. For example, the map buffer 320 may temporarily store some map segments among the plurality of map segments in the nonvolatile memory device 100. The map buffer 320 may be divided into a plurality of physical slots. Each physical slot may be a physical space or a physical memory area that stores data. The map segment may be stored for each physical slot. In order to divide the physical slot, a physical slot number may be allocated to each physical slot.

In an embodiment, the memory controller 200 may temporarily store the some map segments among the map segments, which are stored in the nonvolatile memory device 100, in the volatile memory device 300. For example, the memory controller 200 may temporarily store the some map segments in physical slots of the map buffer 320. The memory controller 200 may obtain the physical address corresponding to the logical address from the host 400 using the some map segments temporarily stored in the physical slots.

In order to obtain the physical address corresponding to the logical address (which is provided from the host 400) from the volatile memory device 300, the map segments temporarily stored in the plurality of physical slots may be searched. In order to quickly search for the map segments, information indicating each map segment and a physical slot number of the physical slot in which each map segment is stored may be stored. Such information may be stored, for example, in a hash table, a map tree, or in another form.

A hash table may be formed based on a key, a hash function, a hash, a value, and a hash slot. A hash slot may be referred to as a storage or a bucket. Since the hash function may always return a constant hash, a hash function has a characteristic that data may be quickly searched when knowing only a corresponding hash without searching for all data. In addition, a hash function has a characteristic that complexity to insert (or store) data into the hash table or delete the data from the hash table is oriented towards O(1). However, a hash collision may occur in the hash table. A hash collision is a characteristic that may occur in a hash table and, for example, may correspond to a situation in which the hash function of the hash table calculates the same hash for two different keys.

In an embodiment, the hash table may store most recently loaded map segment and physical slot information indicating a physical slot in which most recently loaded map segment is stored. For example, each hash slot of the hash table may store a corresponding map segment most recently stored in the map tree. In addition, information indicating the physical slot in which the map segment most recently stored in the map tree is stored may be stored in each hash slot of the hash table. The information indicating the physical slot may be physical slot information. The physical slot information may indicate, for example, a number of the physical slot, e.g., physical slot number.

A map tree may have a tree structure. In one embodiment, the tree structure may include a plurality of tree slots and may indicate a connection relationship between each tree slot. The connection relationship may include an upper or lower relationship. In one embodiment, an upper tree slot may have one or more lower tree slots, but the lower tree slot may have only one upper tree slot. For example, the tree structure may be a structure in which the upper tree slot and the lower tree slot are connected like a tree branch. The map tree may include the tree slots, with each tree slot having a plurality of lower tree slots. The tree slot may be referred to as a "node", and the lower tree slot may be referred to as a "child node".

Since the map tree has a tree structure, hash collisions may not occur in a map tree. However, when, for example, the complexity to insert data or delete data is O(logn), searching, inserting, and deleting data in the map tree may be relatively slower than in a hash table. For example, when storing data, the tree slot may be processed one by one. When deleting data, a plurality of tree slots may be processed at once. Since an operation of deleting the data stored in the tree slots at once is performed, the time to process the operation may be delayed. In an embodiment, the physical slot information and the map segment may be stored in each tree slot of the map tree. In an embodiment, the map tree may have a binary tree structure.

In an embodiment, the memory controller 200 may include a hash table and a map tree. In addition, the memory controller 200 may search for physical addresses corresponding to logical addresses provided from the host 400 from the hash table. When a physical address is not searched in the hash table, the memory controller 200 may search for the physical address in the map tree.

In an embodiment, when a physical address corresponding to a logical address provided from the host 400 is not searched in both the hash table and the map tree, the memory controller 200 may control the nonvolatile memory device 100 to obtain the map segment including the mapping information on the logical address provided from the host 400 and the physical address.

According to an embodiment, an improved read operation may be performed using all advantages of the hash table and the tree structure. For example, in accordance with one or more embodiments, hash collisions (which are disadvantages of the hash table) may be prevented using the map tree of the tree structure. In addition, search costs or delays may be reduced by storing recently updated map segments using the hash table.

The memory controller 200 may include a map caching controller 210, a map buffer manager 220, and a mapping manager 230. The map caching controller 210 may search for physical addresses corresponding to logical addresses provided from the host 400 in the hash table and the map tree. When a physical address corresponding to a logical address provided from the host 400 is not searched in the hash table and the map tree, map caching controller 210 may control the nonvolatile memory device 100 to read any one of the plurality of map segments stored in the nonvolatile memory device 100.

The map caching controller 210 may generate a slot allocation request requesting to allocate the physical slot in which the map segment provided from the nonvolatile memory device 100 is to be stored, among the physical slots of the map buffer 320. The map caching controller 210 may provide the slot allocation request to the map buffer manager 220. The map caching controller 210 may generate a release request requesting to release the map segment stored in each physical slot and provide the release request to the map buffer manager 220.

The map buffer manager 220 may allocate an empty physical slot among the physical slots of the map buffer 320 in response to the slot allocation request. The map buffer manager 220 may generate the map segment, the physical slot information indicating the physical slot in which the map segment is to be stored, and tree slot information. The tree slot information may indicate a tree slot in which the map segment and the physical slot information are to be stored. The tree slot information may indicate, for example, a tree slot number (which is a number of the tree slot). The map buffer manager 220 may provide the map segment, the physical slot information, and the tree slot information to the mapping manager 230.

The map buffer manager 220 may generate tree slot information, indicating a tree slot corresponding to a physical slot to be released among the tree slots of the map tree, in response to the release request.

The mapping manager 230 may include the hash table and the map tree. The mapping manager 230 may receive the map segment, physical slot information, and tree slot information. The mapping manager 230 may check the tree slot number using the tree slot information. The mapping manager 230 may store the map segment and the physical slot information in the tree slot having the checked tree slot number among the tree slots of the map tree.

The host 400 may communicate with the storage device 1000 through an interface. The interface may be implemented with a serial advanced technology attachment (SATA) interface, a SATA express (SATAe) interface, a serial attached small computer system interface (SAS) interface, a peripheral component interconnect express (PCIe) interface, a nonvolatile memory express (NVMe) interface, an advanced host controller interface (AHCI), or a multimedia card interface. However, the interface is not limited thereto.

The host 400 may communicate with the storage device 1000 to store the data in the storage device 1000 or obtain the data stored in the storage device 1000. In an embodiment, the host 400 may provide the write request to the storage device 1000 for requesting to store the data in the storage device 1000. In addition, the host 400 may provide the write request, the data, and the logical address for identifying the data to the storage device 1000.

The storage device 1000 may store the write data including the meta data and the data provided by the host 400 in the nonvolatile memory device 100 in response to the write request provided from the host 400 and may provide a response that the storage is completed to the host 400. In an embodiment, the host 400 may provide the read request to the storage device 1000 for requesting to provide the data stored in the storage device 1000 to the host 400. In addition, the host 400 may provide a read request and a read address to the storage device 1000.

The storage device 1000 may read the read data corresponding to the read address provided by the host 400 from the nonvolatile memory device 100 in response to the read request provided from the host 400 and provide the read data to the host 400 as a response to the read request.

Figure 2:
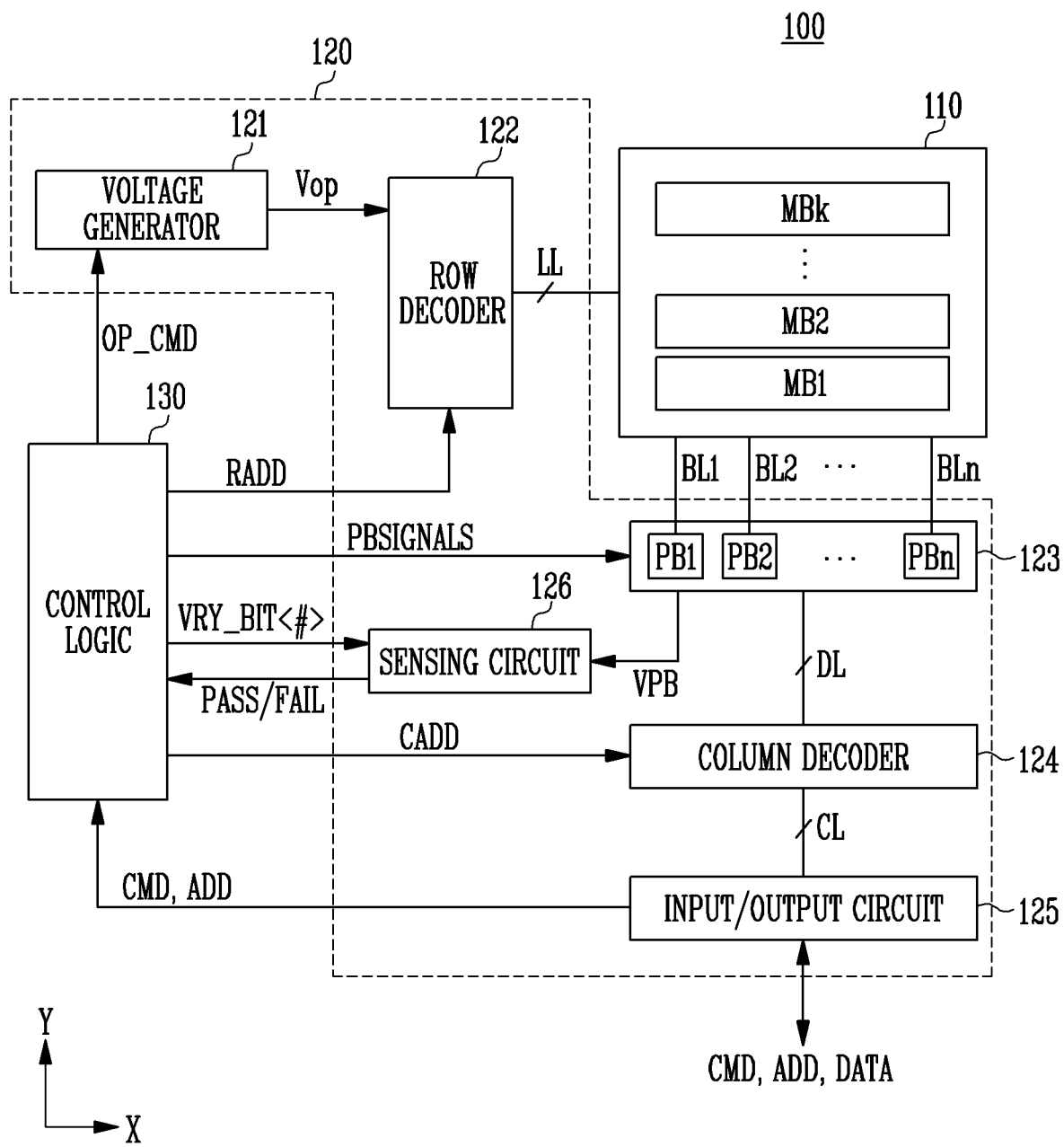
FIG. 2 illustrates an embodiment of a nonvolatile memory device.

FIG. 2 is a diagram illustrating an embodiment of a nonvolatile memory device 100, which may include the memory cell array 110, a peripheral circuit 120, and a control logic 130.

The memory cell array 110 may include a plurality of memory blocks MB1 to MBk (k is a positive integer). The number of memory blocks MB1 to MBk is only an example for describing embodiments of the present disclosure, but is not limited thereto.

Each of the memory blocks MB1 to MBk may be connected to local lines LL and bit lines BL1 to BLn (n is a positive integer). The local lines LL may be connected to a row decoder 122. The local lines LL may be connected to each of the memory blocks MB1 to MBk. The local lines LL may include a first select line, a second select line, and a plurality of word lines arranged between the first select line and the second select lines. The local lines LL may further include dummy lines arranged between the first select line and the word lines, dummy lines arranged between the second select line and the word lines, and pipelines.

The bit lines BL1 to BLn may be commonly connected to the memory blocks MB1 to MBk.

The memory blocks MB1 to MBk may be implemented as a two-dimensional or three-dimensional structure. For example, in the memory blocks MB1 to MBk of the two-dimensional structure, memory cells may be arranged in a direction parallel to a substrate. In the memory blocks MB1 to MBk of the three-dimensional structure, memory cells may, for example, be stacked on a substrate in a vertical direction.

The peripheral circuit 120 may include a voltage generator 121, the row decoder 122, a page buffer group 123, a column decoder 124, an input/output circuit 125, and a sensing circuit 126. The voltage generator 121 may generate various operation voltages Vop used for the program operation, the read operation, and the erase operation in response to an operation command OP_CMD. In addition, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under control of the control logic 130.

As an embodiment, the voltage generator 121 may regulate an external power voltage to generate an internal power voltage. The internal power voltage may be used as an operation voltage of the nonvolatile memory device 100. In an embodiment, the voltage generator 121 may generate a plurality of voltages using an external power voltage or an internal power voltage. For example, the voltage generator 121 may include a plurality of pumping capacitors that receive the internal power voltage, and may generate the plurality of voltages by selectively activating the pumping capacitors in response to the control of the control logic 130. The generated voltages may be supplied to the memory cell array 110 by the row decoder 122.

The row decoder 122 may transfer operation voltages Vop to the local lines LL in response to a row address RADD. The operation voltages Vop may be transferred to selected memory blocks MB1 to MBk through the local lines LL. For example, during the program operation, the row decoder 122 may apply the program voltage to a selected word line and a program pass voltage of a level less than that of the program voltage to unselected word lines. During the program verify operation, the row decoder 122 may apply the verify voltage to the selected word line and a verify pass voltage greater than the verify voltage to the unselected word lines.

During a read operation, row decoder 122 may apply a read voltage to the selected word line and may apply a read pass voltage greater than the read voltage to the unselected word lines.

During an erase operation, the row decoder 122 may select one memory block according to a decoded address. During the erase operation, the row decoder 122 may apply a reference (e.g., ground) voltage to word lines connected to the selected memory block.

The page buffer group 123 may include first to n-th page buffers PB1 to PBn connected to the memory cell array 110 through the first to n-th bit lines BL1 to BLn, respectively. The first to n-th page buffers PB1 to PBn may operate in response to the control of the control logic 130. For example, the first to n-th page buffers PB1 to PBn may operate in response to page buffer control signals PBSIGNALS. In one embodiment, the first to n-th page buffers PB1 to PBn may temporarily store data received through the first to n-th bit lines BL1 to BLn, or may sense a voltage or a current of the bit lines BL1 to BLn during the read operation or the verify operation.

During a program operation, when the program voltage is applied to the selected word line, the first to n-th page buffers PB1 to PBn may transfer data DATA received through the column decoder 124 and the input/output circuit 125 to the selected memory cell through the first to n-th bit lines BL1 to BLn. The memory cells of the selected page are programmed according to the transferred data DATA. The memory cell connected to the bit line to which a program permission voltage (for example, a ground voltage) is applied may have an increased threshold voltage. The threshold voltage of the memory cell connected to the bit line to which a program inhibit voltage (for example, a power voltage) is applied may be maintained.

During a verify operation, the first to n-th page buffers PB1 to PBn may sense data stored in the memory cells selected through the first to n-th bit lines BL1 to BLn from the selected memory cells.

During a read operation, the first to n-th page buffers PB1 to PBn may sense the data DATA from the memory cells of the selected page through the first to n-th bit lines BL1 to BLn, and may output the read data DATA to the input/output circuit 125 under the control of the column decoder 124.

During an erase operation, the first to n-th page buffers PB1 to PBn may float the first to n-th bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or may exchange data with the input/output circuit 125 through column lines CL.

The input/output circuit 125 may transfer the command CMD and the address ADD received from the memory controller 200 to the control logic 130, or may exchange data DATA with the column decoder 124.

During a read operation or verify operation, the sensing circuit 126 may generate a reference current in response to a permission bit signal VRY_BIT<#> and compare a sensing voltage VPB received from the page buffer group 123 with a reference voltage generated by the reference current to output a pass signal PASS or a fail signal FAIL.

The control logic 130 may output the operation command OP_CMD, the row address RADD, the page buffer control signals PBSIGNALS, and the permission bit VRY_BIT<#> in response to the command CMD and the address ADD to control the peripheral circuit 120.

Figure 3:
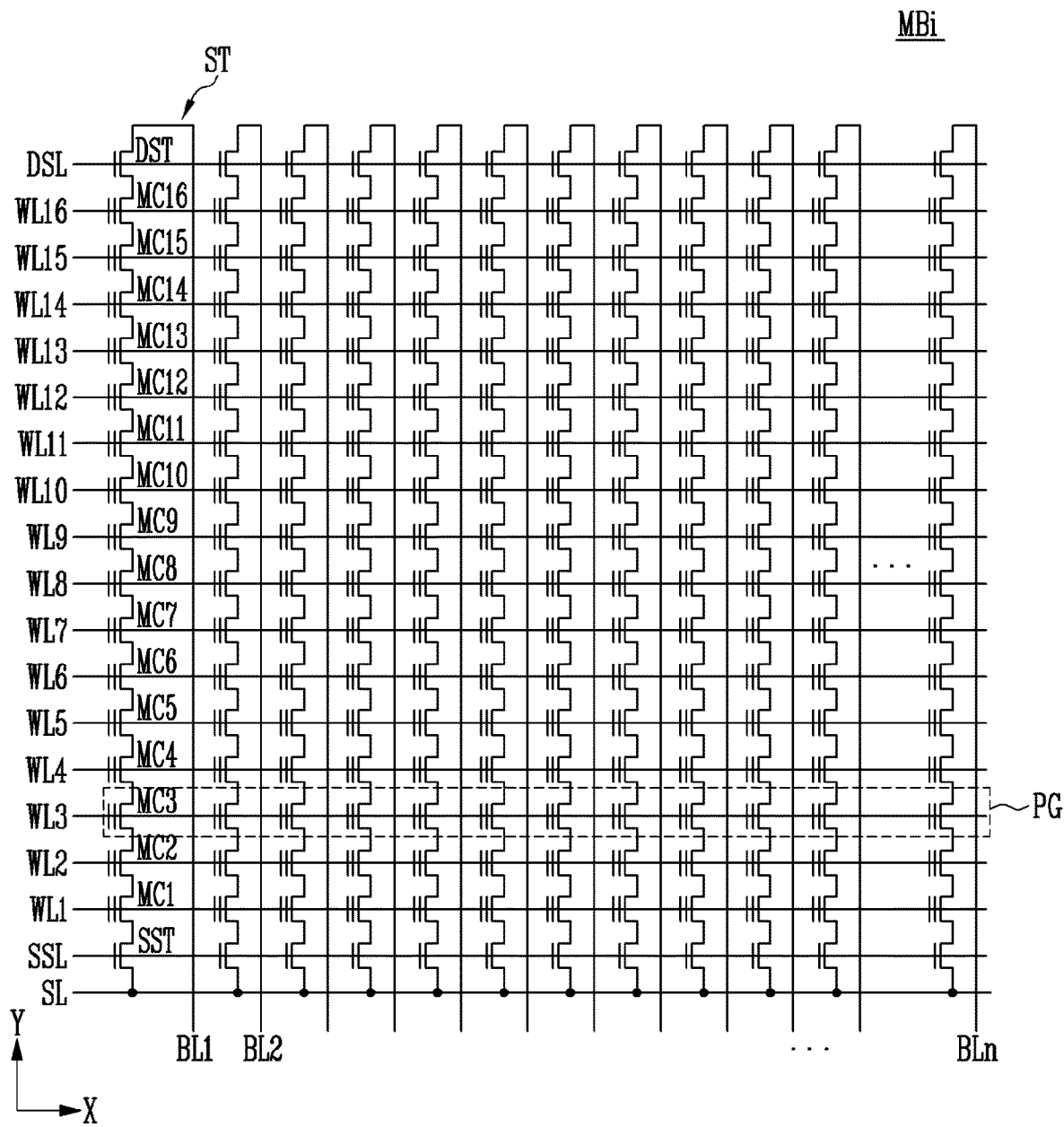
FIG. 3 illustrates an embodiment of a memory block.

FIG. 3 is a diagram illustrating an embodiment of a memory block MBi, which may be representative of the memory blocks MB1 to MBk shown in FIG. 2.

Referring to FIG. 3, the memory block MBi may include a first select line, a second select line, a plurality of word lines WL1 to WL16, a source line SL, a plurality of bit lines BL1 to BLn, and a plurality of strings ST. The first select line may be, for example, a source select line SSL. The second select line may be, for example, a drain select line DSL. The word lines WL1 to WL16 may be arranged in parallel between the source select line SSL and the drain select line DSL. The number of word lines WL1 to WL16 shown in FIG. 3 is an example, and is not limited to that shown in the drawing.

The source line SL may be commonly connected to the plurality of strings ST. The plurality of bit lines BL1 to BLn may be connected to the strings ST, respectively. The plurality of strings ST may be connected to the bit lines BL1 to BLn and the source line SL. The strings ST may be configured to be the same as each other, and thus string ST connected to the first bit line BL1 is described as an example.

The string ST may include a plurality of memory cells MC1 to MC16, at least one first select transistor, and at least one second select transistor. The memory cells MC1 to MC16 may be connected in series between a source select transistor SST and a drain select transistor DST. Gate electrodes of the memory cells MC1 to MC16 may be connected to the word lines WL1 to WL16, respectively. Therefore, the number of memory cells MC1 to MC16 in one string ST may be the same as the number of word lines WL1 to WL16. Any one of the memory cells MC1 to MC16 may be configured as any one of an SLC that stores one bit of data, an MLC that stores two bits of data, a TLC that stores three bits of data, and a QLC that stores four bits of data. However, the present disclosure is not limited thereto, and the memory cell may store five or more bits of data.

A group of memory cells connected to the same word line among memory cells in different strings ST may be a physical page PG. Therefore, the memory block MBi may include the physical pages PG corresponding to the number of word lines WL1 to WL16. Hereinafter, it is assumed that memory cells (for example, MC3) in the physical page PG are selected memory cells.

The first select transistor may be, for example, a source select transistor SST. A first electrode of the source select transistor SST may be connected to the source line SL. A second electrode of the source select transistor SST may be connected to the first memory cell MC1, among the memory cells MC1 to MC16. A gate electrode of the source select transistor SST may be connected to the source select line SSL.

The second select transistor may be, for example, a drain select transistor DST. A first electrode of the drain select transistor DST may be connected to the sixteenth memory cell MC16 among the plurality of memory cells MC1 to MC16. A second electrode of the drain select transistor DST may be connected to the first bit line BL1. A gate electrode of the drain select transistor DST may be connected to the drain select line DSL.

Figure 4:
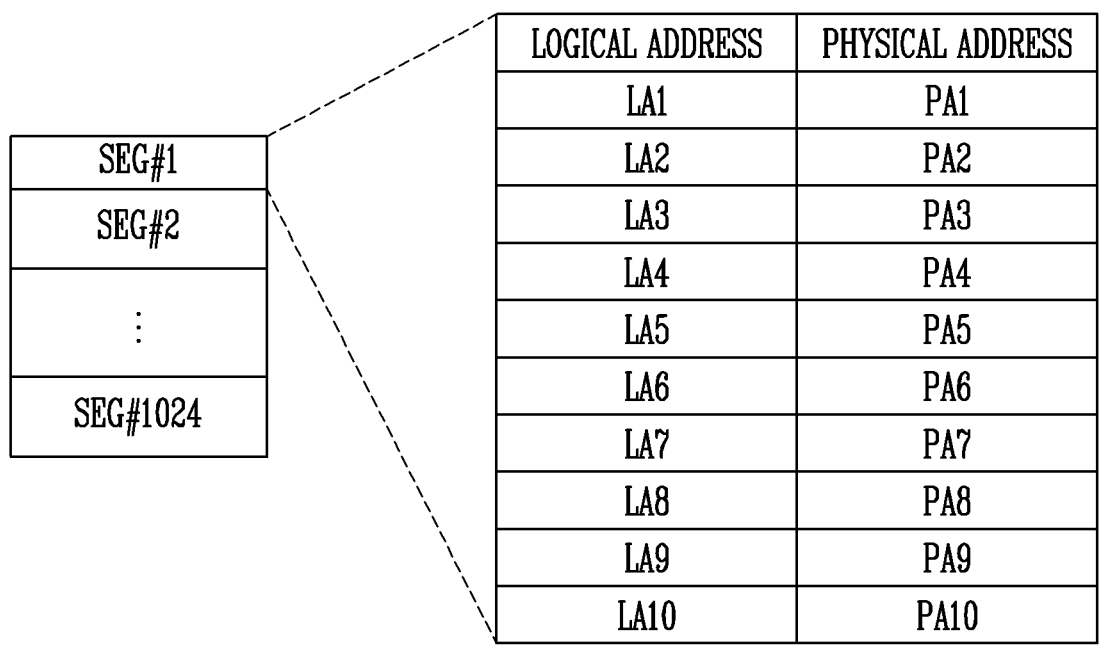
FIG. 4 illustrates an embodiment of a map segment.

FIG. 4 is a diagram illustrating an embodiment of a map segment among a plurality of map segments SEG #1 to SEG #1024, which may be stored in the nonvolatile memory device 100. Referring to FIGS. 1 and 4, for example, the map segments SEG #1 to SEG #1024 may be stored in the system block 101 in the nonvolatile memory device 100.

The number of map segments may be, for example, 1024 as shown in FIG. 4, but is not limited thereto. Hereinafter, it is assumed that the number of map segments SEG #1 to SEG #1024 stored in the nonvolatile memory device 100 is 1024.

Each of the plurality of map segments SEG #1 to SEG #1024 may include a plurality of map entries. One map entry may include one logical address and one physical address. For example, a map entry 1 may include a logical address 1 LA1 and a physical address 1 PA1. In an embodiment, the logical address may be a logical block number and the physical address may be a physical block number. In one embodiment, the logical address may be a logical page number and the physical address may be a physical page number.

Since one map entry includes one logical address and one physical address, one map segment may include a plurality of map entries. For example, the map segment 1 SEG #1 may include 10 map entries. In FIG. 4, 10 map entries are included in one map segment, but the present disclosure is not limited thereto.

Some of the map segments SEG #1 to SEG #1024 may be temporarily stored in the volatile memory device 300. Referring to FIGS. 1 and 4, for example, map segment 1 SEG #1 and map segment 2 SEG #2 may be temporarily stored in the map buffer 320. However, the present disclosure is not limited thereto.

Figure 5:
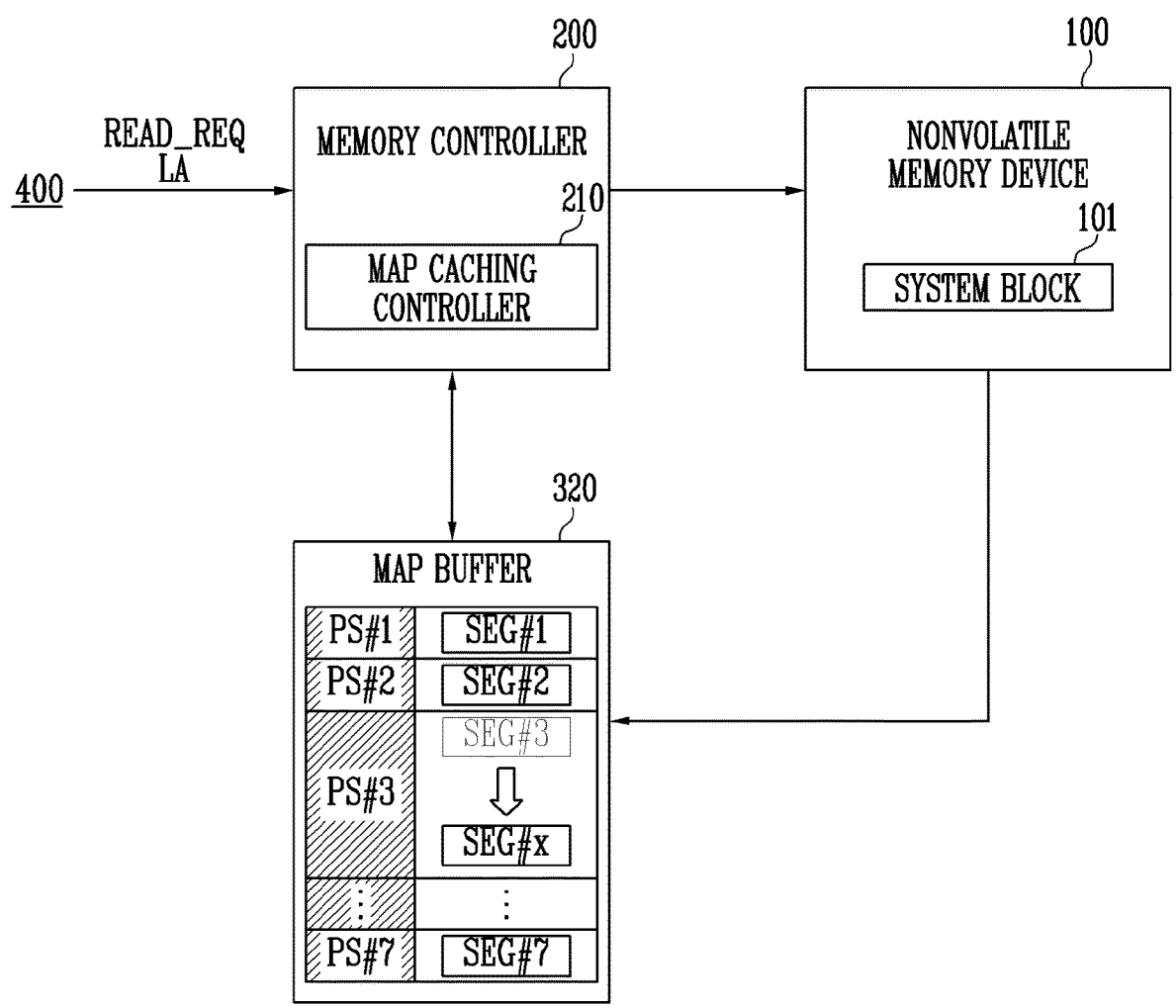
FIG. 5 illustrates an embodiment of a method of loading a map.

FIG. 5 is a diagram illustrating an embodiment of a method of loading a map. Referring to FIGS. 1, 4 and 5, the memory controller 200 may temporarily store some of the map segments SEG #1 to SEG #1024 in nonvolatile memory device 100 in the volatile memory device 300 when booting.

For example, when booting, the map caching controller 210 may provide a physical address and a read command instructing to read the map segment 1 SEG #1 to the map segment SEG #7 (among the plurality of map segments SEG #1 to SEG #1024 stored in system block 101) to the nonvolatile memory device 100. The map caching controller 210 may temporarily store the map segment 1 SEG #1 to the map segment 7 SEG #7 provided from the nonvolatile memory device 100 to a plurality of physical slots PS #1 to PS #7 of the map buffer 320.

The physical slot 1 PS #1 may be a physical slot having a physical slot number 1. The physical slot 2 PS #2 may be a physical slot having a physical slot number 2. The physical slot 3 PS #3 may be a physical slot having a physical slot number 3. The physical slot 7 PS #7 may be a physical slot having a physical slot number 7. The physical slot number may also be expressed as "01h", "02h", "03h", and the like.

The map segment 1 SEG #1 may be stored in the physical slot 1 PS #1. The map segment 2 SEG #2 may be stored in the physical slot 2 PS #2. The map segment 3 SEG #3 may be stored in the physical slot 3 PS #3. The map segment 7 SEG #7 may be stored in the physical slot 7 PS #7. This is only for describing an embodiment of the present disclosure, and is not limited to that shown in FIG. 4.

The host 400 may provide a read request READ_REQ and a logical address LA to the memory controller 200. The memory controller 200 may obtain a physical address corresponding to the logical address LA based on the map segments SEG #1 to SEG #7 temporarily stored in map buffer 320.

For example, when the map segment including the logical address LA is one of the map segments SEG #1 to SEG #7 temporarily stored in the map buffer 320, the map caching controller 210 may obtain the physical address corresponding to logical the address LA.

When the map segment including the logical address LA is not temporarily stored in the map buffer 320, the memory controller 200 may temporarily store a new map segment among map segments SEG #1 to SEG #1024, which are stored in the nonvolatile memory device 100, in the volatile memory device 300.

For example, when the logical address LA is not in the map segments SEG #1, SEG #2, and SEG #3 temporarily stored in the map buffer 320, the map caching controller 210 may provide a physical address and a read command instructing to read a map segment x SEG #x, among map segments SEG #1 to SEG #1024 in the system block 101, to the nonvolatile memory device 100. The map caching controller 210 may temporarily store the map segment x SEG #x provided from the nonvolatile memory device 100 in the physical slot 3 PS #3, which is any one of physical slots PS #1, PS #2, and PS #3 of the map buffer 320. As the map segment x SEG #x is temporarily stored in the physical slot 3 PS #3, the previously stored map segment 3 SEG #3 may be deleted, where x may be a natural number. Hereinafter, it is assumed that the new map segment is the map segment x SEG #x.

After the new map segment is temporarily stored in the volatile memory device 300, the memory controller 200 may obtain the physical address corresponding to the address LA based on the new map segments SEG #1, SEG #2, and SEG #x temporarily stored in the map buffer 320. Temporarily storing the new map segment in the volatile memory device 300 may be considered to be a map load.

Figure 6:
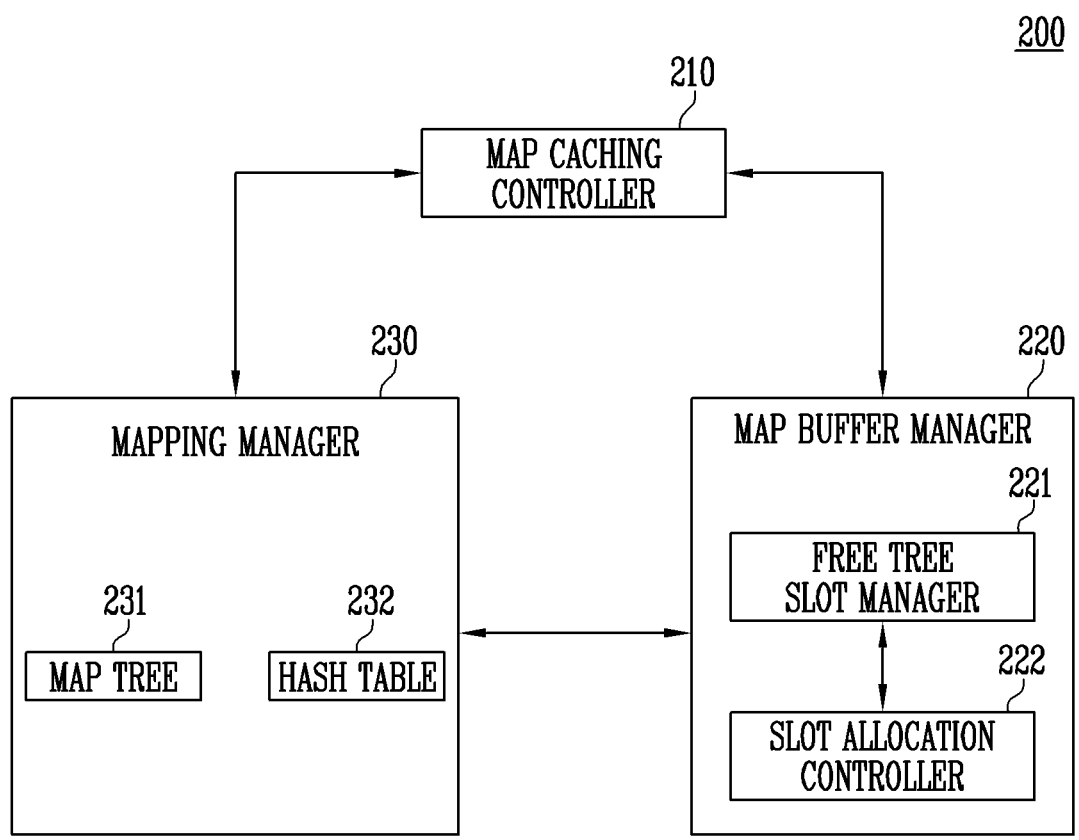
FIG. 6 illustrates an embodiment of a memory controller.

FIG. 6 is a diagram illustrating memory controller 200 according to an embodiment of the present disclosure.

Referring to FIGS. 5 and 6, the memory controller 200 may include the map caching controller 210, the map buffer manager 220, and the mapping manager 230. In an embodiment, the map cache controller 210 may generate a slot assignment request, and may provide the slot allocation request to the map buffer manager 220. The slot allocation request may be a signal requesting to allocate a physical slot in which a first map segment is to be stored among physical slots PS #1, PS #2, and PS #3 of the map buffer 320.

The first map segment may include mapping information between a first logical address provided from the host 400 and a first physical address. Referring to FIG. 5, for example, the first logical address may be the logical address LA in FIG. 5, and the first map segment may be the map segment x SEG #x.

In one embodiment, the map caching controller 210 may generate a release request. In addition, the map caching controller 210 may provide the release request to the map buffer manager 220.

In an embodiment, the map buffer manager 220 may output the first map segment, first physical slot information, and tree slot information in response to the slot allocation request. The first physical slot information may be information indicating the physical slot number (for example, a physical slot number 3) of the physical slot (for example, the physical slot 3 PS #3) in which the first map segment (for example, the map segment x SEG #x) is to be stored.

The tree slot information may be information indicating a tree slot number of a tree slot in which the first map segment and the first physical slot information are stored among the plurality of tree slots of the map tree 231.

In one embodiment, the map buffer manager 220 may provide target tree slot information to the mapping manager 230 in response to the release request. The target tree slot information may be information indicating a tree slot number of a target tree slot. The target tree slot may be a tree slot for invalidating the mapping relationship between the map segment and the physical slot information.

Invalidating the mapping relationship between the map segment and the physical slot information may include processing the physical slot information as meaningless invalid information, such as unidentifiable information or dummy information. In one embodiment, invalidating the mapping relationship between the map segment and the physical slot information may include, for example, invalidating the map segment. However, the present disclosure is not limited thereto. Invalidating the mapping relationship between the map segment and the physical slot information may be include unlinking the tree slot.

The map buffer manager 220 may include a free tree slot manager 221 and a slot allocation controller 222. The free tree slot manager 221 may manage free tree slot information. The free tree slot information may be information indicating a tree slot number of a free tree slot. The free tree slot may be a tree slot in which physical slot information in which a mapping relationship with the map segment is invalid and the map segment are stored among the tree slots of the map tree 231. In one embodiment, the free tree slot may be an empty tree slot among the tree slots of the map tree 231, that is, a tree slot in which data is not stored.

When the free tree slot is generated, the free tree slot manager 221 may store the free tree slot information. For example, the free tree slot manager 221 may sequentially store the free tree slot information in a free slot queue.

The free tree slot manager 221 may store the first map segment provided from the map caching controller 210 in the free slot queue. The free tree slot manager 221 may store the first physical slot information provided from the slot allocation controller 222 in the free slot queue.

The free tree slot manager 221 may provide the free tree slot information as the tree slot information to the mapping manager 230, for example, according to whether the free tree slot information is stored. The free tree slot manager 221 may provide the first map segment and the first physical slot information together with the free tree slot information to the mapping manager 230. An embodiment is described with reference to FIGS. 7 and 9.

The free tree slot manager 221 may store the target tree slot information from the slot allocation controller 222 in the free slot queue. In addition, the free tree slot manager 221 may provide the target tree slot information stored in the free slot queue to the mapping manager 230.

The slot allocation controller 222 may allocate a physical slot from which the map segment is to be deleted among the physical slots PS #1, PS #2, and PS #3 of the map buffer 320.

The slot allocation controller 222 may provide the target tree slot information to the free tree slot manager 221. An embodiment is described with reference to FIG. 7.

The slot allocation controller 222 may allocate the empty physical slot or the physical slot in which the new map segment is to be stored, among the physical slots PS #1, PS #2, and PS #3 of the map buffer 320.

The slot allocation controller 222 may provide the first physical slot information to the free tree slot manager 221. An embodiment is described with reference to FIG. 9.

The slot allocation controller 222 may include the mapping information between the tree slot and the physical slot. The slot allocation controller 222 may be implemented, for example, as a physical memory input/output chip.

The slot allocation controller 222 may allocate or release the physical slot according to a least recently used (LRU) or first in first out (FIFO) policy.

The mapping manager 230 may include a map tree 231 and a hash table 232. The map tree 231 may store the map segment and the physical slot information in each tree slot. The hash table 232 may store the map segment and the physical slot information most recently stored in the map tree 231. Embodiments of the map tree 231 and the hash table 232 are described with reference to FIGS. 8 and 10.

The mapping manager 230 may receive the first map segment, the first physical slot information, and the tree slot information. In this case, a second map segment and second physical slot information may be stored in the tree slot having the tree slot number indicated by the tree slot information.

The second map segment may be a map segment temporarily stored in the volatile memory device 300 before the first map segment is read by the nonvolatile memory device 100. Referring to FIG. 5, for example, when the first map segment is the map segment x SEG #x, the second map segment may be the map segment 3 SEG #3.

The second physical slot information may be information indicating the physical slot number of the physical slot in which the second map segment is stored. Referring to FIG. 5, for example, the second physical slot information may indicate physical slot number 3 of the physical slot 3 PS #3.

The mapping relationship between the second map segment and the second physical slot information may be invalidated before the first map segment, the first physical slot information, and the tree slot information are received by the mapping manager 230. For example, the tree slot having the tree slot number indicated by the tree slot information may be unlinked before the first map segment, the first physical slot information, and the tree slot information are received by the mapping manager 230.

When the mapping relationship between the second map segment and the second physical slot information is invalidated (e.g., when the free tree slot is not present among the tree slots of the map tree 231), the physical slot may be released in response to the release request from the map caching controller 210 in some cases. Embodiments are described with reference to FIGS. 7 and 8.

When the mapping relationship between the second map segment and the second physical slot information is invalid, the mapping manager 230 may delete the second map segment and the second physical slot information, and then may store the first map segment and the first physical slot information in the tree slot.

When the first map segment, the first physical slot information and the tree slot information are received by the mapping manager 230, the tree slot having the tree slot number indicated by the tree slot information may be empty. In this case, the mapping manager 230 may immediately store the first map segment and the first physical slot information in the tree slot.

The mapping manager 230 may receive the target tree slot information. The mapping manager 230 may invalidate the mapping relationship between the target physical slot and the target map segment stored in the target tree slot based on the target tree slot information. An embodiment is described with reference to FIG. 8.

When the first map segment and the first physical slot information are stored in the map tree 231 and the hash table 232, the mapping manager 230 may provide a completion response to the map caching controller 210.

Figure 7:
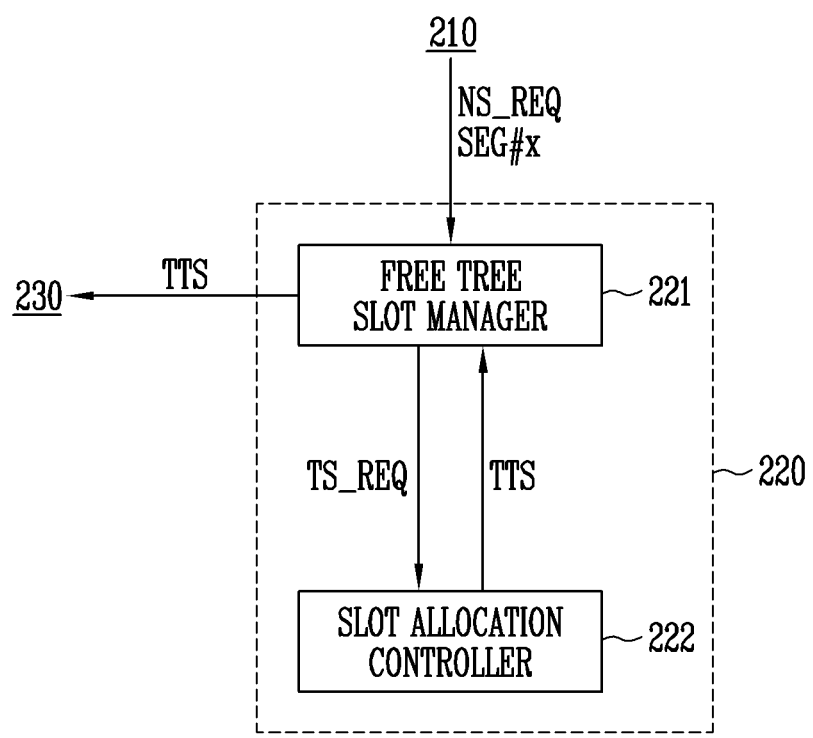
FIG. 7 illustrates an embodiment in which a free tree slot is secured.

FIG. 7 is a diagram illustrating an embodiment in which a free tree slot is secured. Referring to FIG. 7, the free tree slot manager 221 may receive a slot allocation request NS_REQ and the map segment x SEG #x, which is the new map segment, from the map caching controller 210. The map segment x SEG #x may be, for example, the first map segment described with reference to FIG. 6.

The free tree slot manager 221 may determine whether the free tree slot information is previously stored. For example, the free tree slot manager 221 may check whether the free tree slot information is stored in a free slot queue. When the free tree slot information is not stored in the free slot queue, the free tree slot manager 221 may provide a target tree slot request TS_REQ to the slot allocation controller 222. The target tree slot request TS_REQ may be a signal requesting to provide the target tree slot information indicating the target tree slot for invalidating the mapping relationship.

The slot allocation controller 222 may provide target tree slot information TTS to the free tree slot manager 221 in response to the target tree slot request TS_REQ. For example, the slot allocation controller 222 may determine a tree slot corresponding to a physical slot in which a map address is to be deleted as the target tree slot with reference to a mapping table including the mapping information between the physical slot and the tree slot, and may provide the target tree slot information TTS for the target tree slot to the free tree slot manager 221. The physical slot in which the map address is to be deleted may be determined by the FIFO policy or the like. The free tree slot manager 221 may provide the target tree slot information TTS to the mapping manager 230.

Figure 8:
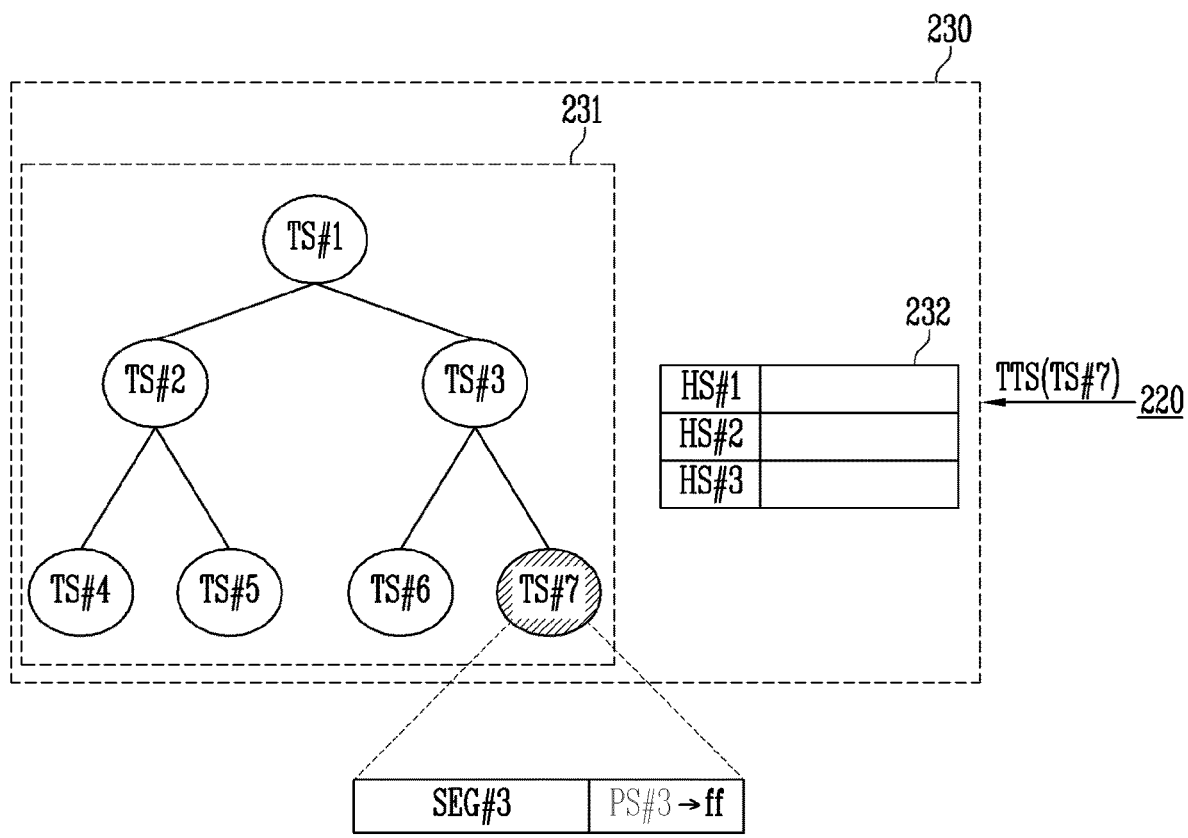
FIG. 8 illustrates an embodiment in which a mapping relationship between a map segment stored in a tree slot and physical slot information is invalidated.

FIG. 8 is a diagram illustrating an embodiment in which a mapping relationship between a map segment stored in a tree slot and physical slot information is invalidated. In this embodiment, it is assumed that the target tree slot is a tree slot 7 TS #7, the target map segment stored in the target tree slot is the second map segment, the second map segment is the map segment 3 SEG #3 described above with reference to FIG. 5, and the physical slot in which the second map segment is stored is the physical slot 3 PS #3 in which the map segment 3 SEG #3 is stored described above with reference to FIG. 5.

Referring to FIGS. 7 and 8, the mapping manager 230 may include the map tree 231 and the hash table 232. The map tree 231 may include a plurality of tree slots TS #1 to TS #7, and the number of tree slots of the map tree 231 may be seven as shown in FIG. 8, but is limited thereto.

A tree slot at the highest level among tree slots TS #1 to TS #7 of the map tree 231 may be defined as a "root". For example, the tree slot 1 TS #1 among tree slots TS #1 to TS #7 of the map tree 231 may be the root.

A tree slot at the lowest level among tree slots TS #1 to TS #7 of the map tree 231 may be defined as a "leaf". For example, the tree slot 4 TS #4, the tree slot 5 TS #5, the tree slot 6 TS #6, and the tree slot 7 TS #7 among tree slots TS #1 to TS #7 of the map tree 231 may be the leaf.

Among tree slots TS #1 to TS #7 of the map tree 231, the remaining tree slots TS #1, TS #2, and TS #3 except for the leaf have one or more branches. For example, the tree slot 3 TS #3 may include a first branch (or a left branch) and a second branch (or a right branch). The tree slot 6 TS #6 may be connected to the first branch of the tree slot 3 TS #3. The tree slot 6 TS #6 and the tree slot 7 TS #7 may be a child node of the tree slot 3 TS #3.

The tree slot 3 TS #3 may include a first branch (or a left branch) and a second branch (or a right branch). The tree slot 6 TS #6 may be connected to the first branch of the tree slot 3 TS #3. The tree slot 7 TS #7 may be connected to the second branch of the tree slot 3 TS #3.

The hash table 232 may include a plurality of hash slots HS #1 to HS #3, and a value generated by inputting a key to a hash function may be stored for each of the plurality of hash slots HS #1 to HS #3. In an embodiment, the value stored in the hash table 232 may be the map address and the physical slot information most recently stored in the map tree 231.

In an embodiment, the mapping manager 230 may invalidate the mapping relationship between the target map segment and the target physical slot stored in the target tree slot based on the target tree slot information TTS. For example, the mapping manager 230 may receive the target tree slot information TTS and check that the target tree slot is the tree slot 7 TS #7 from the target tree slot information TTS. The tree slot 7 TS #7 may include the map segment 3 SEG #3, which is the second map segment, and the physical slot information. The physical slot information stored in the tree slot 7 TS #7 may include information indicating the physical slot number of the physical slot 3 PS #3. The mapping manager 230 may process the physical slot number of the physical slot 3 PS #3 stored in the tree slot 7 TS #7 as invalid information ff.

The tree slot 7 TS #7 including the map segment 3 SEG #3 and the invalid information ff may correspond to the free tree slot. In this case, the free tree slot manager 221 may store the free tree slot information indicating the tree slot 7 TS #7.

As described above, instead of deleting the map segment and the physical slot information stored in the target tree slot, the mapping relationship between the map segment and the physical slot information stored in the target tree slot is invalidated. Therefore, delay in the time to perform the read operation due to a delete operation may be reduced or eliminated.

Figure 9:
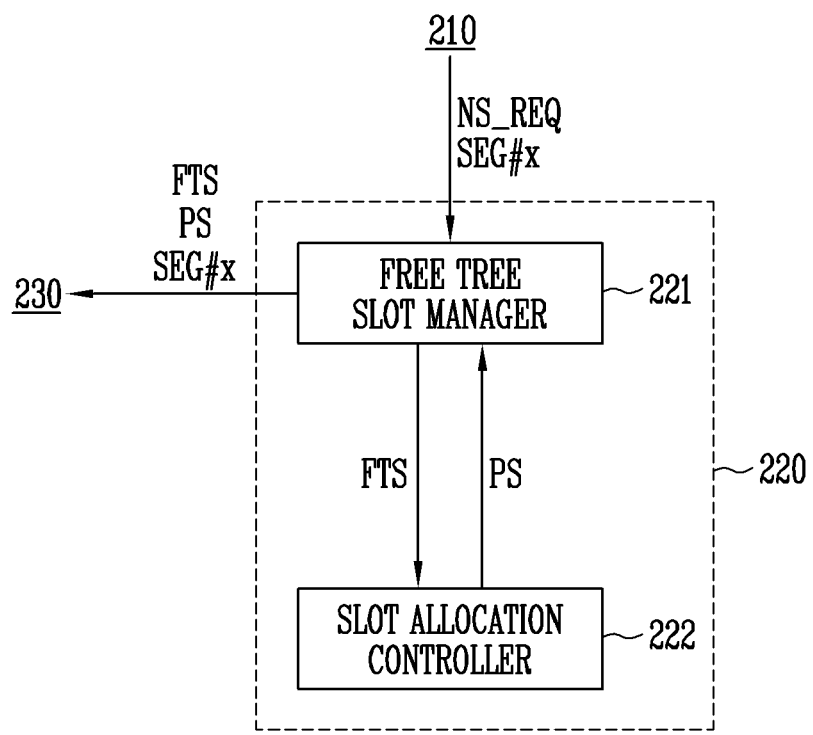
FIG. 9 illustrates an embodiment in which a map segment, physical slot information, and tree slot information are provided to a free tree slot.

FIG. 9 is a diagram illustrating an embodiment in which a map segment, physical slot information, and tree slot information are provided to a free tree slot.

Referring to FIG. 9, the free tree slot manager 221 may receive the slot allocation request NS_REQ and the map segment x SEG #x, which is the new map segment, from the map caching controller 210. The map segment x SEG #x may be the first map segment, for example, as described with reference to FIG. 6.

The free tree slot manager 221 may check whether the free tree slot information is stored in the free slot queue. The free tree slot information may be generated, for example, as described with reference to FIGS. 7 and 8. In one embodiment, the free tree slot information may be stored in advance. In one embodiment, the free tree slot information may be generated after a release operation according to a release request is performed, for example, as described with reference to FIG. 12.

When the free tree slot information is stored in the free slot queue, the free tree slot manager 221 may provide stored free tree slot information FTS to the slot allocation controller 222.

The slot allocation controller 222 may receive the free tree slot information FTS. The slot allocation controller 222 may check the free tree slot from the free tree slot information FTS. The slot allocation controller 222 may allocate the physical slot corresponding to the free tree slot. The slot allocation controller 222 may provide physical slot information PS indicating the physical slot number of the allocated physical slot to the free tree slot manager 221. The physical slot information PS may be the first physical slot information, for example, as described with reference to FIG. 6.

The free tree slot manager 221 may receive the physical slot information PS. The free tree slot manager 221 may provide the free tree slot information FTS as the tree slot information to the mapping manager 230. In addition, the free tree slot manager 221 may provide the map segment x SEG #x and the physical slot information PS to the mapping manager 230 together with the free tree slot information FTS.

In an embodiment, the free tree slot information FTS may be information indicating, for example, the tree slot 7 TS #7 with reference to FIG. 8. For example, the free tree slot information FTS may be the target tree slot information TTS, for example, as described with reference to FIGS. 7 and 8. In this case, the free tree slot manager 221 may provide the target tree slot information TTS to the slot allocation controller 222 after the mapping relationship between the target physical slot and the target map segment stored in the target tree slot is invalidated.

The slot allocation controller 222 may provide the first physical slot information to the free tree slot manager 221 in response to the target tree slot information TTS. The free tree slot manager 221 may provide the first physical slot information provided from the slot allocation controller 222 to the mapping manager 230, and provide the target tree slot information TTS (or the free tree slot information FTS) and the first map segment to the mapping manager 230.

Figure 10:
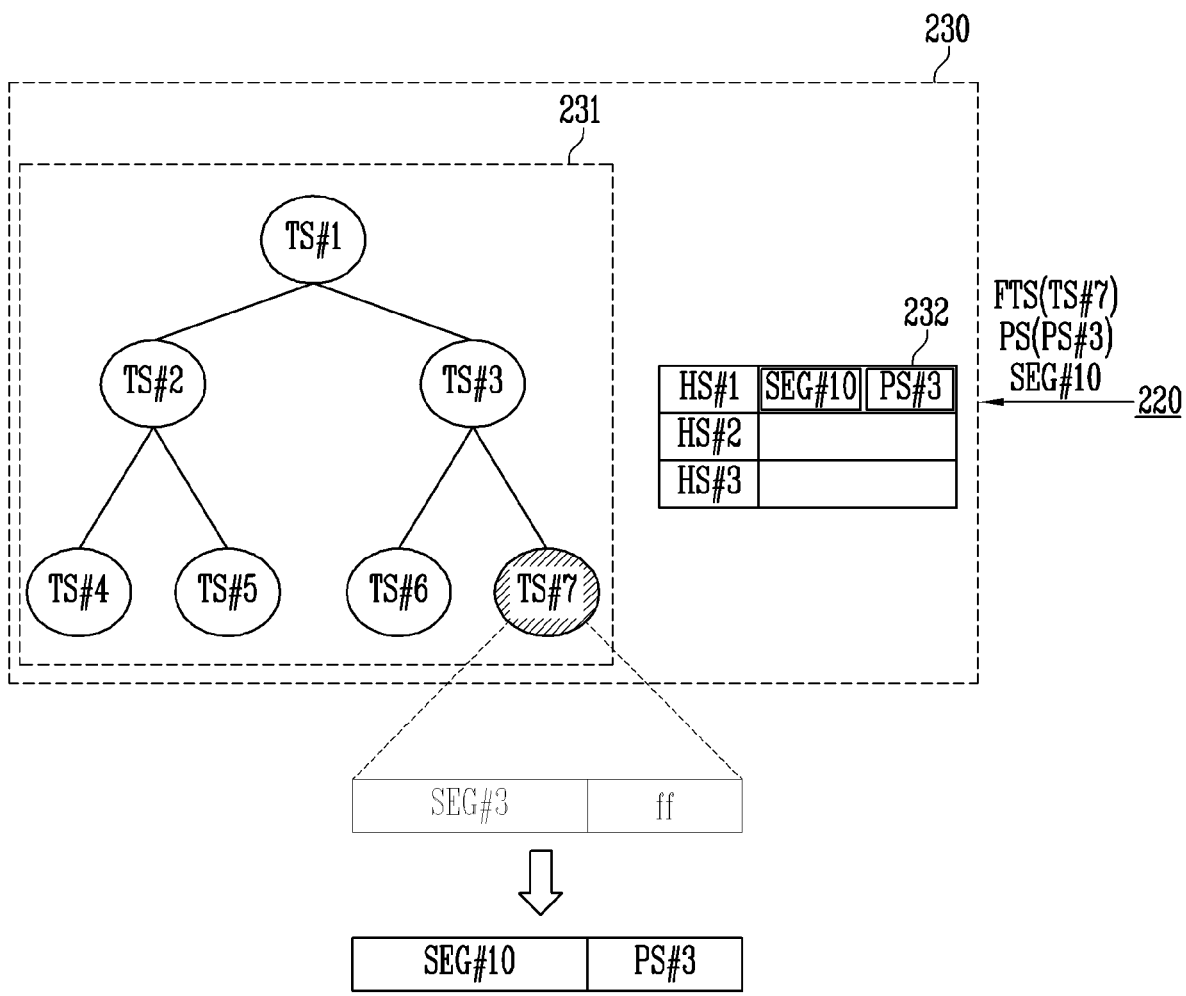
FIG. 10 illustrates an embodiment in which a map segment and physical slot information are stored.

FIG. 10 is a diagram illustrating an embodiment in which a map segment and physical slot information are stored. In this embodiment, it is assumed that the free tree slot is the tree slot 7 TS #7, the new map segment (for example, the first map segment) is the map segment 10 SEG #10, the physical slot information PS is information indicating the physical slot 3 PS #3 as the first physical slot information, the map segment stored in the free tree slot is the second map segment, the second map segment is the map segment 3 SEG #3, and the invalid information ff is stored in the free tree slot.

Referring to FIGS. 9 and 10, in an embodiment, the mapping manager 230 may receive the free tree slot information FTS, the physical slot information PS, and the map segment 10 SEG #10. The mapping manager 230 may check that the free tree slot is the tree slot 7 TS #7 from the free tree slot information FTS.

The mapping manager 230 may delete the invalid information ff and the map segment 3 SEG #3 stored in the tree slot 7 TS #7 of the map tree 231. After the invalid information ff and the map segment 3 SEG #3 stored in the tree slot 7 TS #7 of the map tree 231 are deleted, the mapping manager 230 The may store the map segment 10 SEG #10 and the physical slot information PS in the tree slot 7 TS #7 of the map tree 231.

The map segment 10 SEG #10 and the physical slot information PS may be the map segment and the physical slot information recently stored in the map tree 231. In this case, the mapping manager 230 may store the map segment 10 SEG #10 and the physical slot information PS in the hash table 232. For example, the map segment 10 SEG #10 and the physical slot information PS may be stored in the hash slot 1 HS #1 of the hash table 232. However, the present disclosure is not limited thereto.

When the map segment 10 SEG #10 and the physical slot information PS are stored in the hash table 232, the mapping manager 230 may provide a completion response to the map caching controller 210. The map caching controller 210 may obtain the physical address corresponding to the logical address provided from the host 400 by searching for the map tree 231 and the hash table 232 stored in the mapping manager 230.

Figure 11:
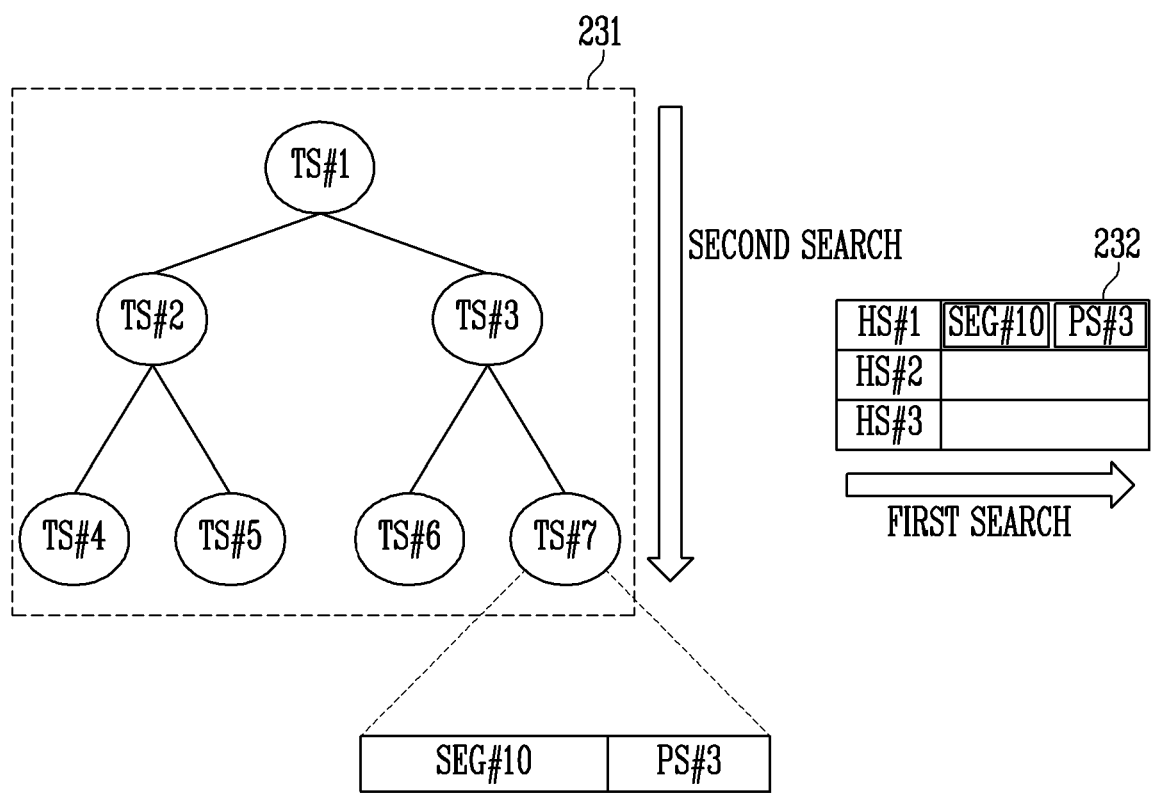
FIG. 11 illustrates an embodiment in which a physical address corresponding to a logical address provided from a host is searched in a mapping manager.

FIG. 11 is a diagram illustrating an embodiment in which a physical address corresponding to a logical address provided from a host is searched in a mapping manager.

Referring to FIG. 11, in response to the read request of the host 400, the map caching controller 210 may search for the physical address corresponding to the logical address provided from the host 400 in the mapping manager 230. In addition, the map caching controller 210 may provide the searched physical address and the read command instructing to perform the read operation on the searched physical address to the nonvolatile memory device 100.

In an embodiment, the map caching controller 210 may firstly search for the physical address corresponding to the logical address provided from the host 400 in the hash table 232. The hash table 232 may store the most recently loaded map segment and physical slot information. For example, the map caching controller 210 may input the logical address provided from the host 400 as a key to the hash function of the hash table 232. The map caching controller 210 may obtain a hash corresponding to the logical address provided from the host 400. The map caching controller 210 may check whether the map segment including the logical address provided from the host 400 is stored in the hash slot corresponding to the hash.

In an embodiment, when the physical address corresponding to the logical address from the host 400 is not searched in the hash table 232, the map caching controller 210 may secondly search for the physical address corresponding to the logical address from the host 400 in the map tree 231.

The number of the map segment stored in the child node connected to a first branch of a parent node of the map tree 231 may be less than the number of the map segment stored in the parent node. The number of the map segment stored in the child node connected to a second branch of the parent node of the map tree 231 may be greater than the number of the map segment stored in the parent node. For example, the number of the map segment stored in the tree slot 1 TS #1 may be greater than the number of the map segment stored in the tree slot 2 TS #2 and may be less than the number of the map segment stored in the tree slot 3 TS #3. In one embodiment, the number of the map segment stored in the tree slot 3 TS #3 may be greater than the number of the map segment stored in the tree slot 6 TS #6 and may be less than the number (for example, 10) of the map segment 10 SEG #10 stored in the tree slot 7 TS #7.

In one embodiment, the map caching controller 210 may check whether the physical address corresponding to the logical address provided from the host 400 is in the map segment stored in the tree slot 1 TS #1. When the physical address corresponding to the logical address provided from the host 400 is not in the map segment stored in the tree slot 1 TS #1, the map caching controller 210 may check whether the physical address corresponding to the logical address provided from the host 400 is in the map segment stored in the tree slot 2 TS #2 or the map segment stored in the tree slot 3 TS #3.

When the number of the map segment including the mapping information between the logical address provided from the host 400 and the physical address is less than the number of the map segment stored in the tree slot 1 TS #1, the map caching controller 210 may search for the tree slot 2 TS #2, and omit a search operation on the tree slot 3 TS #3, the tree slot 6 TS #6, and the tree slot 7 TS #7.

When the number of the map segment including the mapping information between the logical address provided from the host 400 and the physical address is greater than the number of the map segment stored in the tree slot 1 TS #1, the map caching controller 210 may search for the tree slot 3 TS #3, and omit a search operation on the tree slot 2 TS #2, the tree slot 4 TS #4, and the tree slot 5 TS #5.

When the physical address corresponding to the logical address provided from the host 400 is not searched in the hash table 232 and the map tree 231, the map caching controller 210 may control the nonvolatile memory device 100 to obtain the new map segment including the mapping information between the logical address and the physical address.

As described above, performance of the read operation may be improved, by obtaining the physical address corresponding to the logical address provided from the host 400 using the hash table with a relatively fast search speed and the map tree in which the hash collision does not occur.

Figure 12:
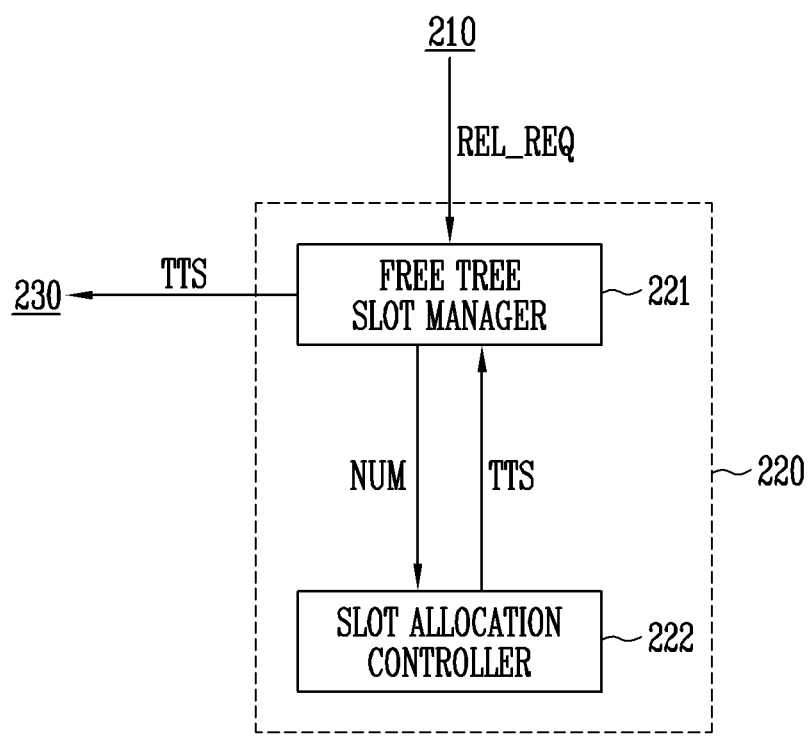
FIG. 12 illustrates an embodiment in which physical slot information and a map segment stored in a tree slot are released.

FIG. 12 is a diagram illustrating an embodiment in which physical slot information and a map segment stored in a tree slot are released.

Referring to FIG. 12, the map caching controller 210 may generate a release request REL_REQ. The release request REL_REQ may be a signal requesting to release the map segment stored in the physical slot. The map caching controller 210 may provide the release request REL_REQ to map buffer manager 220.

The map buffer manager 220 may provide the target tree slot information indicating the target tree slot for invalidating the mapping relationship in response to the release request REL_REQ to the mapping manager 230. For example, the free tree slot manager 221 may receive the release request REL_REQ from the map caching controller 210. The free tree slot manager 221 may provide number information NUM, which is information indicating the number of target slots for invalidating the mapping relationship, to the slot allocation controller 222.

The slot allocation controller 222 may provide the target tree slot information TTS to the free tree slot manager 221 in response to the number information NUM. In this case, the target tree slot information TTS may indicate the tree slot number of the target tree slot. When there are a plurality of target tree slots, the target tree slot information TTS may indicate all tree slot numbers of each target tree slot.

The free tree slot manager 221 may provide the target tree slot information TTS to the mapping manager 230. The mapping manager 230 may invalidate the mapping relationship between the target physical slot and the target map segment stored in the target tree slot based on the target tree slot information TTS. An embodiment is described with reference to FIGS. 7 and 8.

Figure 13:
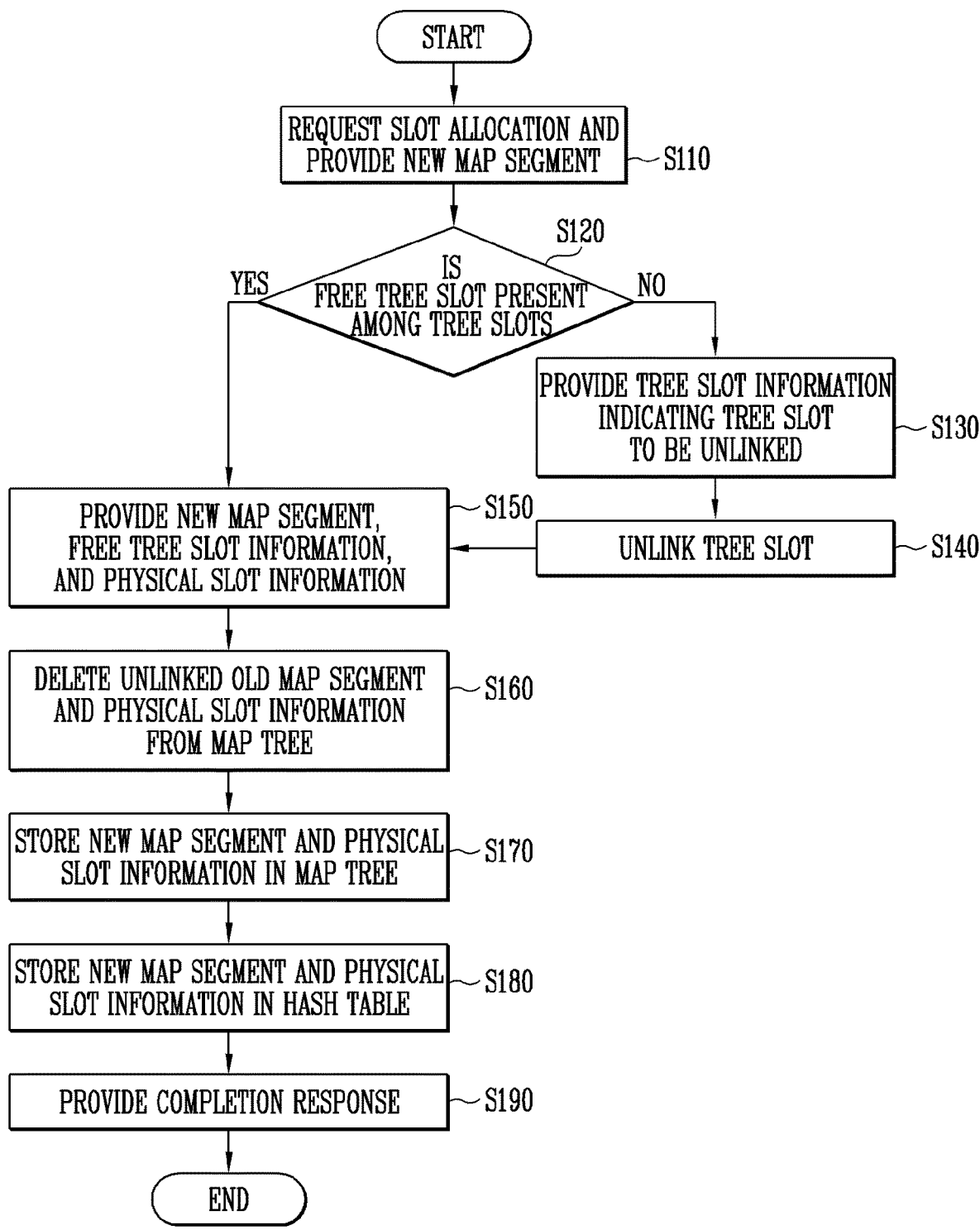
FIG. 13 illustrates an embodiment of a method of operating a memory controller.

FIG. 13 is a diagram illustrating an embodiment of a method of operating a memory controller.

Referring to FIG. 13, the method includes, at S110, the map caching controller 210 providing the slot allocation request NS_REQ and the new map segment (for example, the map segment x SEG #x) to the map buffer manager 220. An embodiment is described with reference to FIG. 7 or 9.

At S120, the map buffer manager 220 checks whether the free tree slot is present among the plurality of tree slots of the map tree 231 in the mapping manager 230. An embodiment is described with reference to FIG. 7.

At S130, when the free tree slot is not present (S120, No), the map buffer manager 220 provides the tree slot information indicating the tree slot to be unlinked to the mapping manager 230. The tree slot information indicating the tree slot to be unlinked may be the target tree slot information TTS, for example, described with reference to FIG. 7 or 12.

At S140, the mapping manager 230 unlinks the corresponding tree slot using the tree slot information indicating the tree slot to be unlinked. Unlinking the tree slot may invalidating the mapping relationship between the map segment stored in the tree slot and the physical slot information PS described above. For example, unlinking the tree slot may be changing the physical slot information PS to the invalid information ff. Operation S150 may be performed after operation S140.

At S150, when the free tree slot is present (S120, Yes), the map buffer manager 220 provides the new map segment, the free tree slot information FTS, and the physical slot information PS to the mapping manager 230 An embodiment is described with reference to FIG. 9.

At S160, the mapping manager 230 deletes the physical slot information PS and an old map segment stored in the unlinked tree slot from the map tree 231. For example, the mapping manager 230 may delete the invalid information ff and the map segment stored in the free tree slot obtained from the free tree slot information FTS. An embodiment is described with reference to FIG. 10.

At S170, the mapping manager 230 stores the new map segment and the physical slot information PS in the map tree 231.

At S180, the mapping manager 230 stores the new map segment and the physical slot information PS in the hash table 232. An embodiment is described with reference to FIG. 10.

At S190, the mapping manager 230 provides the completion response to the map caching controller 210.

Figure 14:
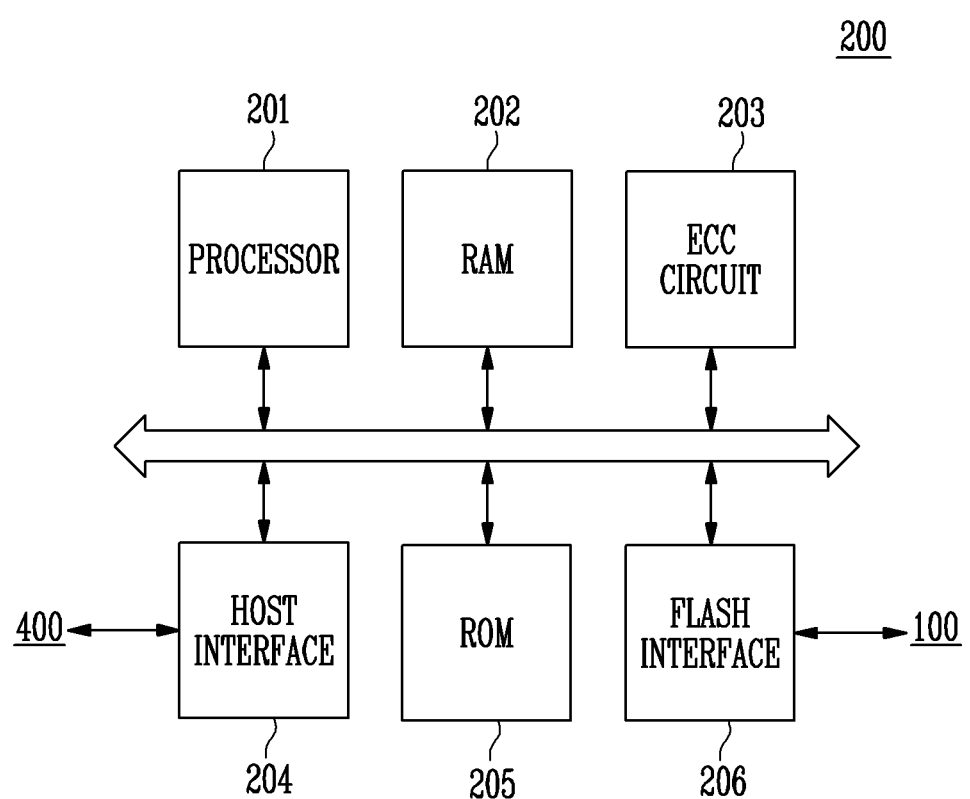
FIG. 14 illustrates an embodiment of a memory controller.

FIG. 14 is a diagram illustrating an embodiment of memory controller 200, which may include a processor 201, a RAM 202, an error correction circuit 203, a host interface 204, a ROM 205, and a flash interface 206. The processor 201 may control overall operation of the memory controller 200. The RAM 202 may be used as a buffer memory, a cache memory, an operation memory, and the like of the memory controller 200. For example, the RAM 202 may be a buffer memory.

The error correction circuit 203 may generate an error correction code (ECC) for correcting a fail bit or an error bit of data received from the nonvolatile memory device 100. The error correction circuit 203 may perform error correction encoding of data provided to the nonvolatile memory device 100 to generate data to which a parity bit is added. The parity bit may be stored in the nonvolatile memory device 100.

The error correction circuit 203 may perform error correction decoding on the data output from the nonvolatile memory device 100. At this time, the error correction circuit 203 may correct an error using parity. For example, the error correction circuit 203 may correct the error using various coded modulations, for example, based on an LDPC code, a BCH code, a turbo code, a Reed-Solomon code, a convolutional code, an RSC, a TCM, and a BCM.

The error correction circuit 203 may calculate an error correction code value of data to be programmed to the nonvolatile memory device 100 in the program operation. The error correction circuit 203 may perform an error correction operation based on the error correction code value on data read from the nonvolatile memory device 100 in the read operation. The error correction circuit 203 may perform an error correction operation of data recovered from the nonvolatile memory device 100 in a recovery operation of failed data.

The memory controller 200 may communicate with an external device (for example, the host 400, an application processor, and the like) through the host interface 204.

The ROM 205 may store various pieces of information required to operate the memory controller 200 in a firmware form.

The memory controller 200 may communicate with the nonvolatile memory device 100 through the flash interface 206. The memory controller 200 may transmit the command CMD, the address ADDR, a control signal CTRL, and the like to the nonvolatile memory device 100 and receive data through the flash interface 206. For example, the flash interface 206 may include a NAND interface.

Figure 15:
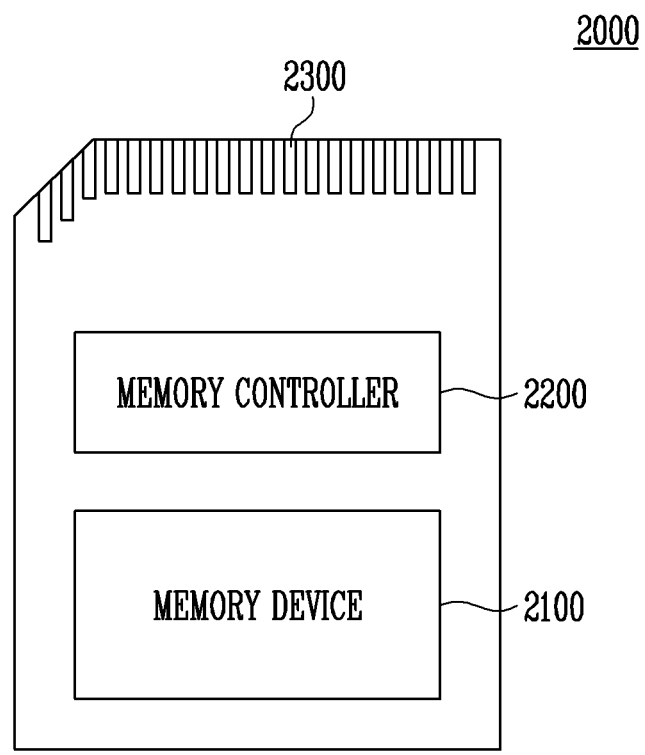
FIG. 15 illustrates an embodiment of a memory card system.

FIG. 15 is a block diagram illustrating an embodiment of a memory card system 2000, which may include a memory device 2100, a memory controller 2200, and a connector 2300.

The memory device 2100 may be configured of various nonvolatile memories. Examples include an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetoresistive RAM (STT-MRAM).

The memory controller 2200 is configured to access the memory device 2100. For example, the memory controller 2200 may be configured to control read, write, erase, and background operations of the memory device 2100. The memory controller 2200 is configured to serve as an interface between the memory device 2100 and the host 400. The memory controller 2200 is configured to drive firmware or other instructions for controlling the memory device 2100. The memory controller 2200 may correspond, for example, to the memory controller 200 of FIG. 1.

The memory controller 2200 may include components, for example, such as a random access memory (RAM), a processor, a host interface, a memory interface, and an error correction circuit. The memory controller 2200 may communicate with an external device through the connector 2300. The memory controller 2200 may communicate with an external device (for example, host 400) according to a communication standard. For example, memory controller 2200 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

The memory device 2100 and the memory controller 2200 may be integrated into one semiconductor device to configure a memory card. For example, the memory controller 2200 and the memory device 2100 may be integrated into one semiconductor device to configure a memory card such as a PC card (personal computer memory card international association (PCMCIA)), a compact flash card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 16:
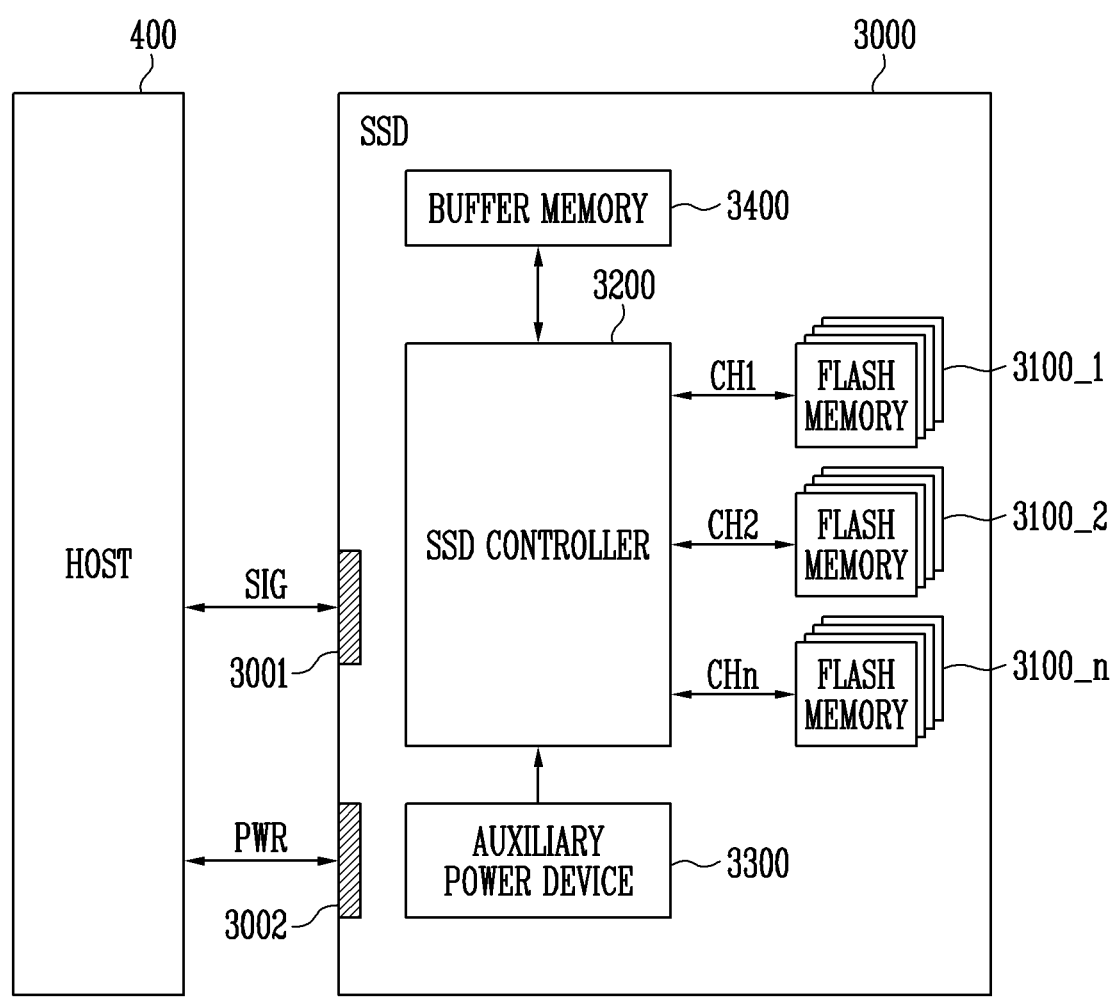
FIG. 16 illustrates an embodiment of a solid state drive (SSD) system.

FIG. 16 is a block diagram illustrating an embodiment of a solid state drive (SSD) system including the host 400 and an SSD 3000. The SSD 3000 exchanges a signal SIG with the host 400 through a signal connector 3001 and receives power PWR through a power connector 3002. The SSD 3000 includes an SSD controller 3200, a plurality of flash memories 3100_1, 3100_2, and 3100_n, an auxiliary power device 3300, and a buffer memory 3400.

According to an embodiment, the SSD controller 3200 may perform the function of the memory controller 200 described with reference to FIG. 1. The SSD controller 3200 may control the flash memories 3100_1, 3100_2, and 3100_n in response to the signal SIG received from the host 400. For example, the signal SIG may be signals based on an interface between the host 400 and the SSD 3000. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3300 is connected to the host 400 through the power connector 3002, may receive the power PWR from the host 400, and may use the power PWR to perform a charging operation. The auxiliary power device 3300 may provide power of the SSD 3000, for example, when power supply from the host 400 is not smooth. For example, the auxiliary power device 3300 may be in the SSD 3000 or may be positioned outside and coupled to the SSD 3000. For example, the auxiliary power device 3300 may be positioned on a main board and may provide auxiliary power to the SSD 3000.

The buffer memory 3400 may temporarily store data, for example, received from the host 400 and/or the flash memories 3100_1, 3100_2, and 3100_n. The buffer memory 3400 may temporarily store meta data (for example, a mapping table) of the flash memories 3100_1, 3100_2, and 3100_n. The buffer memory 3400 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 17:
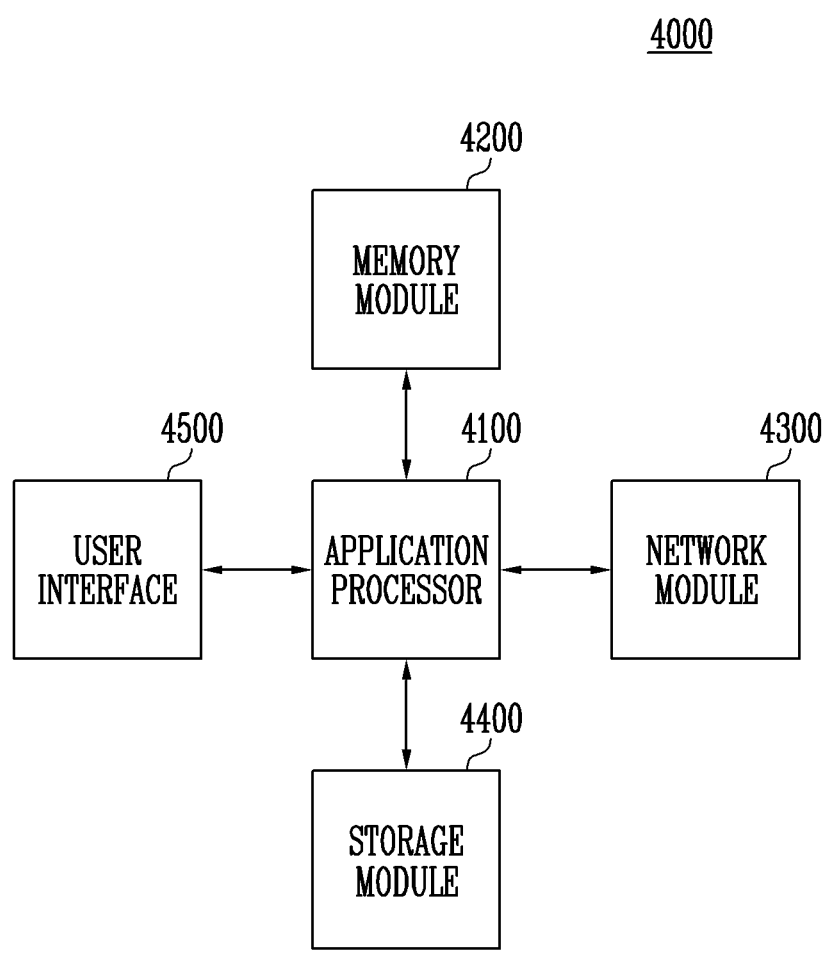
FIG. 17 illustrates an embodiment of a user system.

FIG. 17 is a block diagram illustrating an embodiment of a user system 4000, to which a storage device according to the embodiments described herein may be applied.

Referring to FIG. 17, the user system 4000 includes an application processor 4100, a memory module 4200, a network module 4300, a storage module 4400, and a user interface 4500.

The application processor 4100 may drive components, an operating system (OS), a user program, or the like in the user system 4000. For example, the application processor 4100 may include controllers, interfaces, graphics engines, and the like that control the components in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data, for example, received from the application processor 4100. In one embodiment, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

The storage module 4400 may operate, for example, in the same manner as storage device 1000 described with reference to FIG. 1. The storage module 4400 may include a plurality of nonvolatile memory devices, that operate, for example, in the same manner as nonvolatile memory device 100 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller, comprising:
a map caching controller configured to generate a slot allocation request to allocate a physical slot among a plurality of physical slots, the allocated physical slot configured to store a first map segment including mapping information between a first logical address and a first physical address of a memory device;
a map buffer manager configured to output, in response to the slot allocation request, the first map segment, first physical slot information indicating the physical slot, and tree slot information indicating a tree slot corresponding to the first map segment; and
a mapping manager including a map tree including a plurality of tree slots, the mapping manager configured to store, based on the tree slot information, the first map segment and the first physical slot information in the tree slot among the plurality of tree slots, wherein:
when a second map segment and second physical slot information are stored in the tree slot, the mapping manager is configured to delete the second map segment and the second physical slot information and store the first map segment and the first physical slot information in the tree slot, the second physical slot information indicates a physical slot in which the second map segment is stored, and
at least one of the second map segment and the second physical slot information stored in the tree slot is invalid.

2. The memory controller of claim 1, wherein the map buffer manager comprises:
a free tree slot manager configured to provide free tree slot information as the tree slot information to the mapping manager according to whether the free tree slot information is stored, the free tree slot information indicating a free tree slot among the plurality of tree slots; and
a slot allocation controller configured to provide the first physical slot information to the free tree slot manager, and
the free tree slot is an empty tree slot or is one which stores a map segment and physical slot information of which a mapping relationship with the map segment is invalid.

3. The memory controller of claim 2, wherein:
the free tree slot manager is configured to provide the free tree slot information to the slot allocation controller when free tree slot information is stored, provide the first physical slot information provided from the slot allocation controller to the mapping manager, and provide the first map segment to the mapping manager, and
the free tree slot is configured to store the second map segment and the second physical slot information.

4. The memory controller of claim 2, wherein the free tree slot manager is configured to:
provide a target tree slot request when the free tree slot information is not stored, the target tree slot request requesting to provide target tree slot information indicating a target tree slot for invalidating the mapping relationship to the slot allocation controller,
store the target tree slot information from the slot allocation controller as the free tree slot information, and
provide the stored target tree slot information to the mapping manager.

5. The memory controller of claim 4, wherein the mapping manager is configured to invalidate a mapping relationship between a target map segment and a target physical slot stored in the target tree slot based on the target tree slot information.

6. The memory controller of claim 5, wherein the free tree slot manager is configured to:
provide the stored target tree slot information to the slot allocation controller as the free tree slot information, after the mapping relationship between the target map segment and the target physical slot stored in the target tree slot is invalidated,
provide the first physical slot information from the slot allocation controller to the mapping manager,
provide the stored target tree slot information as the tree slot information to the mapping manager, and
provide the first map segment to the mapping manager, wherein the target map segment is the second map segment.

7. The memory controller of claim 1, wherein the mapping manager further comprises a hash table, the mapping manager is configured to store the first map segment and the first physical slot information stored in the tree slot, in the hash table.

8. The memory controller of claim 7, wherein the hash table is configured to store a most recently loaded map segment and physical slot information indicating a physical slot in which the most recently loaded map segment is stored.

9. The memory controller of claim 7, wherein the mapping manager is configured to provide a completion response to the map caching controller when the first map segment and the first physical slot information are stored in the hash table.

10. The memory controller of claim 1, wherein:
the map caching controller is configured to generate a release request requesting to release a map segment stored in a physical slot,
the map buffer manager is configured to provide target tree slot information indicating a target tree slot for invalidating a mapping relationship to the mapping manager, and
the mapping manager is configured to invalidate a mapping relationship between a target map segment and a target physical slot stored in the target tree slot based on the target tree slot information, wherein the target map segment is the second map segment.

11. A memory controller, comprising:
a mapping manager including a map tree and a hash table, the map tree including a plurality of tree slots configured to store some map segments of a plurality of map segments stored in a nonvolatile memory device and physical slot information indicating a plurality of physical slots in a volatile memory device in which the some map segments are stored, and the hash table configured to store at least one map segment most recently stored in the map tree among the some map segments and physical slot information indicating a physical slot in which the at least one map segment is stored; and
a map caching controller configured to search for a physical address corresponding to a logical address and to provide the searched physical address and a read command instructing to perform a read operation on the searched physical address to the nonvolatile memory device in response to a read request, wherein the plurality of map segments include mapping information between a logical address and a physical address.

12. The memory controller of claim 11, wherein the map tree comprises:
a first tree slot configured to store a first map segment and first physical slot information indicating a physical slot in which the first map segment is stored;
a second tree slot connected to a first branch of the first tree slot and configured to store a second map segment having a number less than a number of the first map segment and second physical slot information indicating a physical slot in which the second map segment is stored; and
a third tree slot connected to a second branch of the first tree slot and configured to store a third map segment having a number greater than the number of the first map segment and third physical slot information indicating a physical slot in which the third map segment is stored.

13. The memory controller of claim 12, wherein the map caching controller is configured to:
check whether the physical address corresponding to the logical address is in the first map segment, and
check whether the physical address corresponding to the logical address is in the second map segment or the third map segment when the physical address corresponding to the logical address is not in the first map segment.

14. The memory controller of claim 11, wherein the map caching controller is configured to:
search for the physical address corresponding to the logical address in the hash table, and
search for the physical address corresponding to the logical address in the map tree when the physical address corresponding to the logical address is not searched in the hash table.

15. The memory controller of claim 14, wherein the map caching controller is configured to control the nonvolatile memory device to obtain a new map segment including mapping information corresponding to the logical address when the physical address corresponding to the logical address is not searched in the hash table and the map tree.

16. A storage device, comprising:
a nonvolatile memory device configured to store a plurality of map segments including mapping information between a logical address and a physical address;
a volatile memory device configured to store some map segments among the plurality of map segments in a plurality of physical slots; and
a memory controller configured to control the nonvolatile memory device to perform a read operation on a first physical address corresponding to a first logical address, in response to a read request, wherein the memory controller includes:
a map tree including a plurality of tree slots configured to store physical slot information indicating the plurality of physical slots and the some map segments, and
a hash table configured to store at least one map segment most recently stored in the map tree among the some map segments and physical slot information indicating a physical slot in which the at least one map segment is stored, and
wherein the memory controller is configured to search for the first physical address in the hash table and search for the first physical address in the map tree when the first physical address is not searched in the hash table.

17. The storage device of claim 16, wherein the memory controller comprises:
a map caching controller configured to:
control the nonvolatile memory device to obtain a first map segment when the first physical address is not searched in the map tree, the first map segment including mapping information between the first logical address and the first physical address, and
generate a slot allocation request to allocate a physical slot in which the first map segment is to be stored among the plurality of physical slots;
a map buffer manager configured to output the first map segment, first physical slot information indicating the physical slot, and tree slot information indicating a tree slot in which the first map segment and the first physical slot information are to be stored, in response to the slot allocation request; and
a mapping manager configured to receive the first map segment, the first physical slot information, and the tree slot information and to store the first map segment and the first physical slot information in the tree slot among the plurality of tree slots.

18. The storage device of claim 17, wherein:
when a mapping relationship between a second map segment and the second physical slot information stored in the tree slot is invalid, the mapping manager deletes the second map segment and the second physical slot information, and stores the first map segment and the first physical slot information in the tree slot, and the second physical slot information indicates a physical slot in which the second map segment is stored.

19. The storage device of claim 18, wherein:

when the first map segment and the first physical slot information are stored in the tree slot, the mapping manager is configured to store the first map segment and the first physical slot information, which are stored in the tree slot, in the hash table.

20. The storage device of claim 17, wherein:

the map caching controller is configured to generate a release request requesting to release a map segment stored in a physical slot, the map buffer manager is configured to provide target tree slot information indicating a target tree slot for invalidating a mapping relationship to the mapping manager, and the mapping manager is configured to invalidate a mapping relationship between a target map segment and a target physical slot stored in the target tree slot based on the target tree slot information.

* * * * *